United States Patent
Nakashima et al.

(10) Patent No.: US 8,374,108 B2
(45) Date of Patent: Feb. 12, 2013

(54) MOBILE COMMUNICATION SYSTEM, AND MOBILE UNIT, BASE STATION UNIT AND METHOD THEREFORE

(75) Inventors: Daiichiro Nakashima, Chiba (JP); Hidekazu Tsuboi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 746 days.

(21) Appl. No.: 12/300,768

(22) PCT Filed: May 15, 2007

(86) PCT No.: PCT/JP2007/059981
§ 371 (c)(1),
(2), (4) Date: Nov. 13, 2008

(87) PCT Pub. No.: WO2007/132861
PCT Pub. Date: Nov. 22, 2007

(65) Prior Publication Data
US 2009/0209256 A1   Aug. 20, 2009

(30) Foreign Application Priority Data
May 16, 2006  (JP) .................................. 2006-136259

(51) Int. Cl.
*H04B 7/00* (2006.01)
(52) U.S. Cl. ..................................................... 370/310
(58) Field of Classification Search .................. 370/241, 370/252, 254, 255, 310, 328, 329, 345, 431, 370/442, 458, 459, 464, 498, 521, 229, 230–231, 370/235, 236, 331, 336–337, 347–348, 503–504; 455/403, 422.1, 436, 39, 67.11, 67.7, 73, 455/550.1, 561
See application file for complete search history.

(56) References Cited

U.S. PATENT DOCUMENTS

| | | | |
|---|---|---|---|
| 6,201,966 B1 | 3/2001 | Rinne et al. | |
| 6,498,933 B1* | 12/2002 | Park et al. | 455/436 |
| 7,020,108 B2 | 3/2006 | Virtanen | |
| 7,133,382 B2 | 11/2006 | Steudle | |
| 7,672,254 B2* | 3/2010 | Kim et al. | 370/256 |
| 7,843,879 B2* | 11/2010 | Agin et al. | 370/331 |
| 2002/0006119 A1* | 1/2002 | Steudle | 370/329 |
| 2003/0117980 A1* | 6/2003 | Kim et al. | 370/332 |
| 2005/0260992 A1* | 11/2005 | Moon et al. | 455/436 |
| 2007/0037594 A1* | 2/2007 | Palenius et al. | 455/502 |
| 2007/0097914 A1* | 5/2007 | Grilli et al. | 370/329 |

OTHER PUBLICATIONS

Motorola, "E-UTRAN Measurement Gap Control for Inter-Frequency and Inter-RAT Handover", 3GPP TSG-RAN WG2 Meeting #58, Japan, May 7-11, 2007, R2-072012.
NTT DoCoMo, Inc. "Inter-frequency/RAT Measurement Gap Control", 3GPP TSG RAN WG1 and WG2 Joint Meeting, #52, 2006, R2-060841.
NTT DoCoMo, Inc. "Measurements for LTE Intra- and Inter- RAT Mobility" 3GPP TSG RAN WG2 #50, France, Tdoc-R2-060086. Jan. 9-13, 2006.

(Continued)

*Primary Examiner* — Omar Ghowrwal
(74) *Attorney, Agent, or Firm* — Birch, Stewart, Kolasch & Birch, LLP

(57) ABSTRACT

In mobile communication system having a plurality of mobile traits and a plurality of base station units, the system of the present invention is characterized in that the base station unit has a gap period length setting section for setting the length of the gap period for the mobile unit depending on the type of the radio access technology to be monitored by the mobile unit.

11 Claims, 12 Drawing Sheets

| RADIO ACCESS TECHNOLOGY | FREQUENCY BAND USED | LENGTH OF GAP PERIOD |
|---|---|---|
| UTRA | $f_1$ MHz BAND | $T_{10}$ |
| | $f_2$ MHz BAND | $T_{11}$ |
| GSM | $f_3$ MHz BAND | $T_{20}$ |
| | $f_4$ MHz BAND | $T_{21}$ |
| NON-3GPP SYSTEM | $f_5$ GHz BAND | $T_{30}$ |
| | $f_6$ GHz BAND | $T_{31}$ |

OTHER PUBLICATIONS

3GPP TR (Technical Report) 25.814, "Technical Specification Group Radio Access Network; Physical Layer Aspects for Evolved UTRA", (Release 7), V1.0.1 (Nov. 2005), pp. 1-72.

3GPP TR 25.913, "Technical Specification Group Access Network; Requirements for Evolved UTRA (E-UTRA) and Evolved UTRAN (E-UTRAN)", (Release 7), V7.2.0 (Dec. 2005), pp. 117.

3GPP TR 25.858 "Technical Specification Group Access Radio Network; High Speed Downlink Packet Access: Physical Layer Aspects", (Release 5), V5.0.0 (Mar. 2002), pp. 1-31.

Tachikawa, T. et al. "W-CDMA Mobile Communication System", 7th Edition, Maruzen Co., Ltd., 2004, pp. 140-141 ISBN4-621-04894-5.

* cited by examiner

FIG. 4A

| RADIO ACCESS TECHNOLOGY | LENGTH OF GAP PERIOD |
|---|---|
| UTRA | $T_{10}$ |
| GSM | $T_{20}$ |
| NON-3GPP SYSTEM | $T_{30}$ |

FIG. 4B

| RADIO ACCESS TECHNOLOGY | FREQUENCY BAND USED | LENGTH OF GAP PERIOD |
|---|---|---|
| UTRA | $f_1$MHz BAND | $T_{10}$ |
|  | $f_2$MHz BAND | $T_{11}$ |
| GSM | $f_3$MHz BAND | $T_{20}$ |
|  | $f_4$MHz BAND | $T_{21}$ |
| NON-3GPP SYSTEM | $f_5$GHz BAND | $T_{30}$ |
|  | $f_6$GHz BAND | $T_{31}$ | great# MOBILE COMMUNICATION SYSTEM, AND MOBILE UNIT, BASE STATION UNIT AND METHOD THEREFORE

TECHNICAL FIELD

The present invention relates to a mobile communication system, and a mobile unit, a base station unit and a mobile communication method therefore and, particularly to such system, and a mobile unit, a base station unit, and a mobile communication method adapted to provide wireless communication between cells to which the same frequencies are assigned under the same radio access technology, between cells to which mutually different frequencies are assigned under the same radio access technology, or between cells under mutually different radio access technologies.

Priority is claimed on Japanese Patent Application No. 2006-136259 filed May 16, 2006, the content of which is incorporated herein by reference.

BACKGROUND ART

In a cellular mobile communication system based on the same radio access technology (RAT), a number of base station units are remotely located, each of which constitutes a wireless communication area, thereby to provide a service area, wherein a mobile unit in one of the cells is allowed to have access to the base station unit through a radio channel. When the mobile unit moves from one cell to another during on-going conversation, the so-called handover HO is performed to permit the communication to be continued in a seamless manner.

There are two different types of handover, i.e., the intra-frequency handover (intra-freq HO) on one hand, and the inter-frequency handover (inter-freq HO) on the other.

In addition, in a cellular mobile communication system based on mutually different radio access technologies, there is the inter-RAT handover (inter-RAT HO) performed when a mobile unit moves across a cell-to-cell border based on mutually different radio access technologies.

The cell-to-cell handover under the same radio access technology, which may be called intra-RAT handover (intra-RAT HO), is in Contrast to the last-mentioned inter-RAT HO.

Referring to FIG. 12 illustrating the handover processing to be performed while the mobile unit is in motion, base station units BS1, BS2, BS3 and BS4 are separately located on a two-dimensional plane. These base station units BS1, BS2, BS3 and BS4 provide wireless communication links to mobile units through carrier waves at frequencies f1, f2, f3 and f4, respectively; and using radio access technologies RAT1, RAT1, RAT1 and RAT2, respectively.

Base station units BS1, BS2, BS3 and BS4 can be in communication with mobile units MS1, MS2, MS4 and MSG located in cell c1; with mobile units MS4 and MS5 located in cell c2, with mobile units MS2 and MS3 located in cell c3; and with mobile units MS6 and MS7 located in cell c4.

Mobile unit MS4 in motion between cells c1 and c2 performs the handover based on the intra-RAT-HO (and inter-freq-HO). Similarly, mobile unit MS2 in motion between cells c1 and c3 performs the handover based on the intra-RAT-HO (and intra-freq-HO); while mobile unit MS6 in motion between cells c1 and c4 performs the handover based on the inter-RAT-HO (and inter-freq-HO).

The well-known W-CDMA (wideband-code division multiple access) radio access technology provided by the 3GPP (3rd generation partnership project) has been in use for the third generation, cellular mobile communication systems as the standard radio access technology. For the W-CDMA system, the so-called compressed mode is provided to monitor or measure the performance of base station units operating at mutually different frequencies to provide the intra-RAT-HO (and inter-freq-HO) and/or inter-RAT-HO (and inter-freq-HO).

Under the above-mentioned situation, the base station unit sets a gap period, as show in FIG. 13(a), during which the data transmission through the dedicated channel DPCH is stopped. On the other hand, the mobile unit switches its frequency during the gap period, thereby to monitor the function of the base station unit operating at a different frequency.

In the 3GPP, the high speed downlink packet access HSDPA to realize for downlink a high speed packet transmission at a maximum transmission rate of 14.4 Mbps, which is an extension of W-CDMA wireless interface, has already been adopted as a technology standard (Non-Patent Document 2 referred to). In the adopted standard, high-speed downlink shared control channel HS-SCCH and high-speed physical downlink shared channel HS-PDSCH are additionally defined for downlink as independent channels separate from the above-mentioned dedicated channel to which the compressed mode is inherently applied. Similarly, high-speed dedicated physical control channel HS-DSPCCH is additionally defined for uplink.

In the HSDPA, adaptive modulation and coding scheme AMCS is adopted, which switches, depending on downlink channel quality indicator CQI indicative of the current state of the transmission paths for the respective mobile units, wireless transmission parameters such as data modulation scheme for the shared data channel, error correction scheme, coding rate for the error correction code, spreading factors for time/frequency domain, and the order of code-multiplexing of multicodes. In addition, hybrid automatic repeat request scheme HARQ is also adopted, under which a mobile unit sends the acknowledgement/negative acknowledgement ACK/NACK signals and the CQI signal hack to the base station unit through the dedicated control channel.

FIGS. 13(b) and 13(c) illustrate examples of packet signals transmitted from a base station unit to a mobile unit, with FIG. 13(b) showing a shared control channel for the base station unit-to-mobile unit transmission and FIG. 13(c) showing a shared data channel for the base station Unit-to-mobile unit transmission.

In the HSDPA, a mobile unit does not have, during the time period corresponding to the gap period, those packet data allotted thereto which are addressed to itself, because the exchange of data transmission with a base station unit cannot be performed if the base station unit operating at a different frequency is to be monitored or measured. The base station unit is therefore adapted to send, in advance of the provision of the gap period, instructions to the mobile unit to stop the allotment of data for a shared data channel through the shared control channel. In response to the instructions, the mobile unit provides the gap period, thereby to perform the monitoring and the measurement of the base station unit operating at a different frequency.

More specifically, in contrast to the situation of FIG. 13(a), wherein the base station unit provides the gap period by applying the data compression or the like to continuous data to be sent to a mobile unit, the gap period is provided in the case of FIGS. 13(b) and 13(c) by preventing the allotment of the packet control signal and the packet data for the mobile unit to the gap period.

It is to be noted here that the radio interface of W-CDMA- or HSDPA-based mobile communication system is generally referred to as universal terrestrial radio access UTRA.

Further study is now in progress for the evolved universal terrestrial radio access EUTRA and for the evolved universal terrestrial radio access network EUTRAN, both for the third generation radio access technology.

The orthogonal frequency division multiplexing access OFDMA has been proposed for providing the downlink for the SUTRA, while the AMOS technique has been applied to the OFDMA system as the EUTRA scheme (Non-Patent Documents 3 and 4 referred to). For the EUTRA scheme, the radio frame structure for the downlink transmission and a mapping method for the radio channel have been proposed (Non-Patent Document 4 referred to).

In regard to the intra-RAT-HO (and the intra-freq-HO) and/or the inter-RAT-HO (and the inter-freq HO) for the EUTRA/EUTRAN, an autonomous gap control method for autonomously providing the gap period when the instantaneous CQI value becomes lower than the mean CQI value has been proposed as a method for controlling the gap period to monitor or measure a different frequency-based base station unit (FIG. 1 of Non-Patent Document 5 referred to).

FIGS. 14(a) and 14(b) illustrate a method of controlling the gap period, which has been proposed in the past. In the prior-art method illustrated, the mobile unit receives the shared pilot channel, measures the instantaneous CQI values at a predetermined CQI measurement interval, and reports the measured CQI values to the base station unit. At the same time, the mobile unit averages the instantaneous CQI values at a predetermined interval (a system parameter) to provide mean CQI values, and then compare the mean CQI values with a CQI threshold value, which is also a system parameter. When the mean CQI value is lower than the CQI threshold value, the mobile unit sets itself in a measurement mode for monitoring or measuring the base station unit operating at a different frequency.

In the measurement mode, the mobile unit stops receiving the signals from the base station unit currently in communication, thereby to provide the gap period, when the measured instantaneous CQI value is lower than the mean CQI value. Upon receipt of the instantaneous CQI value from a certain mobile unit, the base station unit provides a mean CQI value for that mobile unit in a manner similar to the calculation at the mobile unit. The base station unit then compares the mean CQI value with a CQI threshold value, which is a system parameter. When the mean CQI value is higher than the CQI threshold value, the base station unit sets itself at an ordinary mode, while it sets itself at a measurement mode when the mean CQI value is lower than the CQI threshold value. In the measurement mode, the base station unit stops transmission of data packets to the mobile unit currently in communication therewith, to provide the gap period, when the measured instantaneous CQI value is lower than the mean CQI value.

As shown in FIG. 14(a), the mobile unit terminates the gap period to resume the measurement of instantaneous CQI values and the report to the base station unit, after the completion of the monitoring or measurement of the base station unit operating at a different frequency. A similar processing is repeatedly performed thereafter, as shown in FIG. 14(b), which illustrates the successive formation of a plurality of gap periods g1 to g6.

A next-generation mobile unit adapted to the EUTRA/EUTRAN is required to be operable in a plurality of mobile communication systems, which utilize mutually different radio access technologies. More specifically, such next-generation, mobile unit must be operable in mobile communication systems utilizing the UTRA, GSM (global system for mobile communication), or other radio access technologies, which are not specified even in the 3GPP standards. Such mobile communication systems may have a different frame length, different frame structure, and different means or processes for measuring the quality of signal reception at the mobile units. As a result, a mobile unit under control by a base station unit of the EUTRA/EUTRAN mobile communication system may not always be able to set, in the inter-RAO-HO (and the inter-freq-HO), the length of the gap period which is optimum to such radio access technology, due to the difference in minimum required gap length for the monitoring or measurement of a different radio access technology-based base station unit. When the length of the gap period is set at a value longer than a minimum required gap, that results in an unutilized portion in the gap period, adversely affecting the spectral efficiency as well as the time efficiency.

Non-Patent Document 1: Keiji Tachikawa "W-CDMA Mobile Communication System," ISBN4-621-04894-5

Non-Patent Document 2: 3GPP TR technical Report 25.858 and HSDPA specification—related materials (http://www.3gpp.org/ftp/Specs/html-info/25-series.htm)

Non-Patent Document 3: 3GPP TR (Technical Report) 25.913, V2.1.0 (2005-05), Requirements for Evolved Universal Terrestrial Radio Access (UTRA) and Universal Terrestrial Radio Access Network (UTRAN). (http://www.3gpp.org/ftp/Spec/html-info/25913.htm)

Non-Patent Document 4: 3GPP TR (Technical Report) 25.814, V1.0.1 (2005-11), Physical Layer Aspects for Evolved UTRA. (http://www.3gpp.org/ftp/Specs/html-info/25814.htm)

Non-Patent Document 5: NTT DoCoMo, Inc. "Measurement for LTE Intra- and Inter-RAT Mobility," 3GPP TSG RAN WG2 Meeting #50, Sophia Antipolis, France, 9-13 Jan. 2006

DISCLOSURE OF INVENTION

Problem to be Solved by the Invention

With a view to obviating the difficulties described above, it is an object of the invention to provide a mobile communication system, and a mobile unit, a base station unit and a method therefore, capable of utilizing frequency and time in a more efficient manner.

Means for Solving the Problem

According to the present invention, there is provided a mobile communication, system having a plurality of mobile units and a plurality of base station units, wherein the base station unit has a gap period setting section for setting the length of a gap period for a mobile unit, depending on the type of radio access technology to be monitored by the mobile unit.

According to one aspect of the invention, there is provided a mobile communication system of the type described above, wherein the gap period setting section of the base station unit is adapted to set the length of the gap period for the mobile unit, depending on the type of the radio access technology to be monitored and reported by the mobile unit.

According to another aspect of the invention, there is provided a mobile communication system of the type described above, wherein the gap period setting section is adapted to set the lengths of a plurality of the gap periods for the mobile unit, depending on the types of the radio access technologies to be monitored by the mobile unit.

According to the present invention, there is provided a mobile communication system having a plurality of mobile units and a plurality of base station units, wherein the base station unit has a gap period setting section for setting the length of a gap period for a mobile unit, depending on the type of combinations of the radio access technology to be monitored by the mobile unit and the frequency band utilized for the wireless communication.

According to one aspect of the invention, there is provided a mobile communication system of the type described above, wherein the gap period setting section of the base station unit is adapted to set the length of the gap period for the mobile unit, depending on the type of the combination of the radio access technology monitored and reported by the mobile unit and the frequency band utilized for the wireless communication.

According to another aspect of the invention, there is provided a mobile communication system of the type described above, wherein the gap period setting section of the base station unit is adapted to simultaneously set the lengths of a plurality of gap periods for the mobile unit, depending on the type of the combination of the radio access technology to be monitored by the mobile unit and the frequency band utilized for the wireless communication.

According to still another aspect of the invention, there is provided a mobile communication system as described above, wherein the gap period setting section of the base station unit is adapted to set the lengths of the gap periods by resetting, when the base station unit receives from a mobile unit a reception quality indicator, a gap period of a length set at a longer value than the short gap length among the plurality of the simultaneously set gap lengths, and by continuously setting, when the base station unit does not receive within the short gap length from the mobile unit a reception quality indicator, a gap period set at a value longer than the short gap length.

According to still another aspect of the invention, there is provided a mobile communication system as described above, wherein the mobile unit has a gap period setting section for setting the length of the gap period, depending on the type of radio access technology to be monitored.

According to still another aspect of the invention, there is provided a mobile communication system as described above, wherein the mobile unit has a gap period setting section for setting the length of the gap period, depending on the type of the combination of the radio access technology to be monitored and the frequency band utilized for the wireless communication.

According to still another aspect of the invention, there is provided a mobile communication system as described above, wherein the mobile unit has a first mode-decision section for determining, based on the reception quality indicator, a measurement mode for monitoring the adjacent base station unit or an ordinary mode for not monitoring the adjacent base station unit, wherein the gap period setting section of the mobile unit is adapted to set the length of the gap period on the basis of the decision performed at the first mode-decision section and the reception quality indicator, wherein the base station unit has a second mode-decision section for determining, based on file reception quality indicator fed back from the mobile unit, whether the mobile unit is in the measurement mode or the ordinary mode, and wherein the gap period setting section at the base station unit sets the gap length on the basis of the decision performed at the second mode decision selection.

According to still another aspect of the invention, there is provided a mobile communication system as described above, wherein the mobile unit has a first mode decision section for determining the measurement mode for monitoring an adjacent base station unit or the ordinary mode for not monitoring an adjacent base station unit, wherein the gap period setting section of the mobile unit is adapted to set the length of the gap period on the basis of the result of the decision performed at the first mode decision section and the reception quality indicator, and wherein the gap period setting section of the base station unit is adapted to set the length of the gap on the basis of the decision performed at the first mode decision section and the reception quality indicator fed back from the mobile unit.

According to still another aspect of the invention, there is provided a mobile communication system as described above, wherein the mobile unit has a first mode decision section for determining, on the basis of the reception quality indicator, the measurement mode for monitoring an adjacent base station unit or the ordinary mode for not monitoring a adjacent base station unit, wherein the gap length setting section of the mobile unit is adapted to set, on the basis of the decision performed at the first mode decision section and the reception quality indicator, the length of the gap period, and wherein the gap length setting section of the base station unit is adapted to set, based on the reception quality indicator fed back from the mobile unit, the length of the gap period.

According to a further aspect of the invention, there is provided a mobile unit, wherein the mobile unit adapted to perform wireless communication with a base station unit has a gap length-setting section for setting the length of the gap period depending on the type of the radio access to be monitored.

According to still further aspect of the invention, there is provided a mobile unit, wherein the mobile unit for performing wireless communication with a base station has a gap setting section for setting the length of the gap, depending on the type of combination of the radio access technology to be monitored and the frequency band utilized for the wireless communication.

According to a further aspect of the invention, there is provided a base station unit, wherein the base station unit for communication with a mobile unit has a gap period setting section for setting the length of the gap period, depending on the type of radio access technology to be monitored by the mobile unit.

According to still further aspect of the invention, there is provided a base station unit, wherein the base station unit for communication with the mobile unit has a gap setting section for setting the length of the gap period for the mobile unit, depending on the type of combination of the radio access technology to be monitored by the mobile unit and the frequency band utilized for the wireless communication.

According to a further aspect of the invention, there is provided a mobile communication method for providing wireless communication between a plurality of mobile units and a plurality of base station units, wherein the base station unit is adapted to set the length of the gap period for the mobile units, depending on the type of radio access technology to be monitored by the mobile unit.

According to still further aspect of the invention, there is provided a mobile communication method for providing mobile wireless communication between a plurality of mobile units and a plurality of base station units, wherein the base station unit is adapted to set the length of the gap period, for the mobile unit, depending on the type of combination of the radio access technology to be monitored by the mobile unit and the frequency band utilized for the wireless communication.

As described above, in the present invention, the base station unit is adapted to set the length of the gap period for the mobile unit, depending on the type of radio access technology to be monitored by the mobile unit.

This makes it possible for the base station unit to set the length of the gap period depending on the type of radio access technology to be monitored by the mobile unit, with the result that the setting of redundant gap period can be avoided to utilize the radio frequency spectrum more efficiently.

BRIEF DESCRIPTION OF THE DRAWINGS

FIG. 4A shows the relationship between the radio access technology used in the first embodiment and the length of the gap period.

FIG. 4B shows the relationship among the radio access technology frequency band utilized and the length of the gap period.

REFERENCE SYMBOLS

Figure 1:
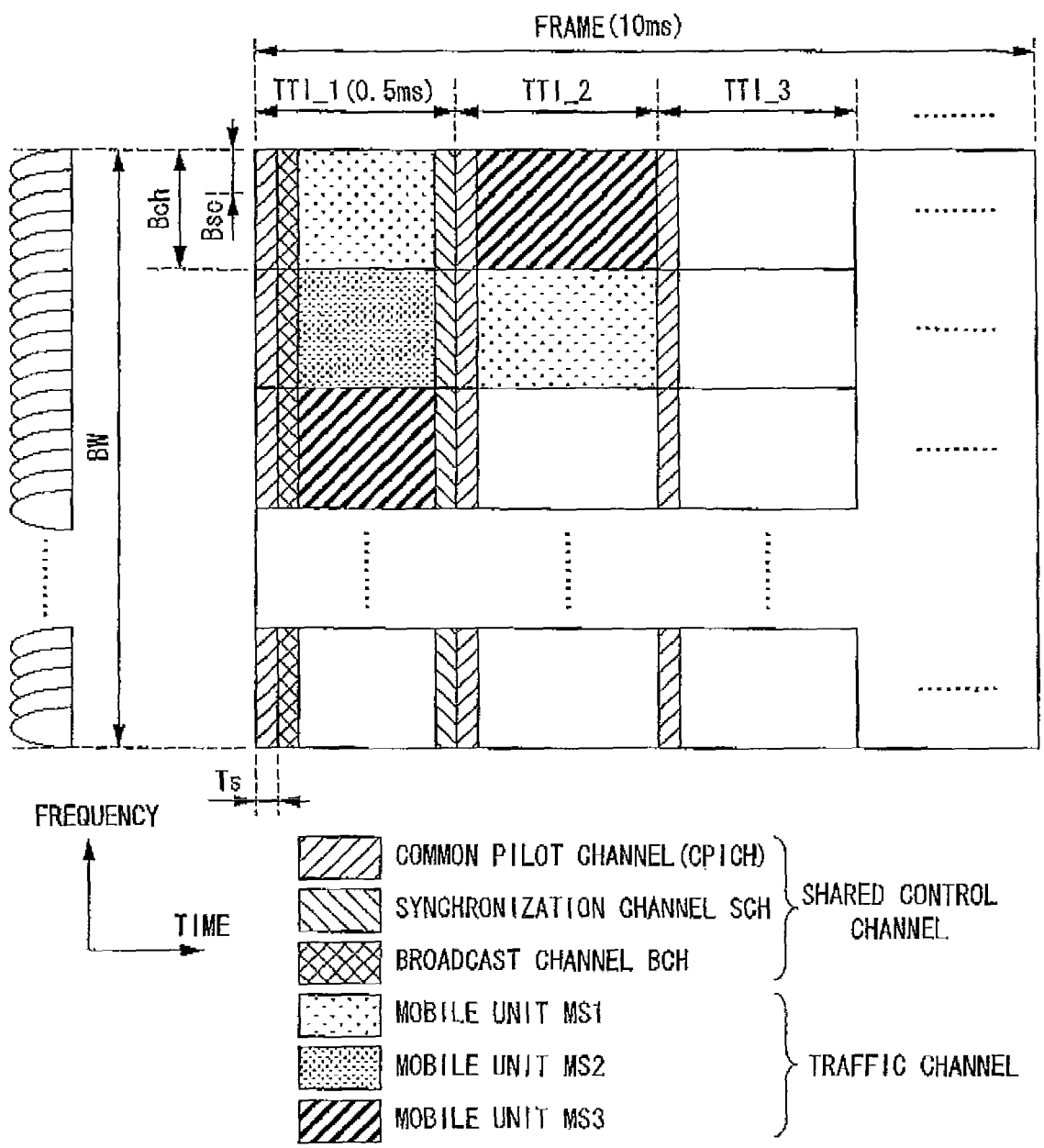
FIG. 1 shows an example of downlink radio frame structure for a 3GPP-based EUTRA.

In the drawings, reference letters/numerals BS1, BS2, BS3 and BS4 denote base station units; MS1, MS2, MS4 and MSG, mobile units; 11, mean CQI value deriving section; 12, memory; 13, mode decision section; 14, feedback interval selection section; 21, mean CQI value deriving section; 22, memory; 23, mode decision section; 24, resource allocation interval selection section; 30, communication section; 31, timer; 32, control section; 33, instantaneous CQI value measuring section; 34, feedback interval selection section; 40, communication section; 41, timer; 42, control section; and 43, resource allocation interval setting section.

BEST MODE FOR CARRYING OUT THE INVENTION

First Embodiment

A mobile communication system according to a first embodiment of the invention will now be described.

In FIG. 1 showing an example of the downlink radio signal frame structure for the 3GPP-based EUTRA with time and frequency taken along the abscissa and the ordinate, respectively, the downlink radio frame consists of a plurality of subcarriers occupying two dimensional radio resource blocks RB defined by frequency bandwidth Bch and transmission timing interval TTI. In FIG. 1, BW denotes the frequency bandwidth of the downlink signal; Bch, frequency bandwidth of the resource block; Bsc, frequency bandwidth of the subcarrier; and Ts, an OFDM symbol length.

As shown in FIG. 1, common pilot channel CPICH is mapped to the leading portion of each of the TTL while broadcast channel BCH and synchronization channel SCH are mapped to the leading portion of each frame of the radio signal A part of the rest of each resource block is used as a traffic channel TCH, while it is mapped, with each of the mobile units addressed through the use of AMCS.

Upon turning-on of power, the mobile unit receives the synchronisation channel, and identifies the carrier off-set, the OFDM symbol timing, radio frame timing TTI timing, and cell number group (cell group index)/cell number (cell index) (e.g., scramble code number group/scramble code number). The mobile unit then receives, through the broadcast channel, system broadcast information unique to the base station unit, and enter into a waiting mode subsequently to the location registration, and then into active mode after going through the connection process performed through the downlink paging indicator channel PICH to achieve the wireless connection to the base station unit. The mobile unit then, measures the instantaneous CQI value and feeds the measured instantaneous CQI value back to the base station unit. In the waiting mode, the mobile unit is not in packet data communication with the base station unit. In contrast, in the active mode, the mobile unit is in packet data communication with the base station unit. In place of the paging indicator channel and the paging channel mentioned above, a downlink shared control channel SCCK may be used.

The base station unit receives the instantaneous CQI value from each of the mobile units, and allocates a packet data to each of the resource blocks of the downlink traffic channels. The allocation of the packet data is also referred to as packet data scheduling, resource allocation or resource block allocation, which all have the same meaning.

The packet data allocation is achieved, for example, by the localized allocation in which resource blocks in channels of good signal propagation quality are allocated to users of relatively small fluctuation with time of propagation path, thereby to achieve multiuser diversity effect; and/or by the distributed allocation in which resource blocks (or subcarriers therein) in channels of broader bandwidth are allocated to users of relatively large fluctuation with time of the propagation path, thereby to achieve frequency diversity effect.

The packet data scheduling can be achieved through the three well-known algorithms, i.e., the EE (round robin) method, the MaxCIR (maximum carrier to interference ratio) method, and the PF (proportional fairness) method.

The RR method uniformly allocates the resource blocks to the downlink traffic channels without any regard to the status of the downlink CQI value for each of the mobile units (users). This method gives highest priority to fairness, with the effect of scheduling is limited with the average throughput for a cell as a whole being lowest compared with other methods.

The MaxCIR method allocates the resource blocks for the downlink traffic channel to a mobile unit exhibiting a highest instantaneous CQI value. Therefore, the effect of scheduling is great for the mobile unit of high instantaneous CPI value, providing high throughput and averaged throughput for the downlink of the whole of the cell. However, for those mobile units with low instantaneous CQI values, the resource blocks are not practically allocated, resulting in very low throughput and unfairness among the mobile units.

The PF method allocates, on the basis of the ratio of the instantaneous CQI value to the mean CQI value, the resource blocks for the traffic channel to those mobile units which exhibit a higher-than-average instantaneous CQI values. This method makes virtually the time for resource block assignment to the mobile units fair and, at the same time, allocates resource blocks to those users with priority given to those with higher CQI values. This results in lower average throughput for the cell as a whole, although not so significantly as in the RR method described above.

The present embodiment changes in the active mode the interval of the measurement of the instantaneous CQI values (i.e., the interval of the feedback of the instantaneous CQI values) at the mobile unit in the measurement mode. In association with the change, the uplink resource allocation interval for the feedback of the instantaneous CQI values at the base station unit, or the downlink resource allocation interval is changed.

It is assumed here that the mobile communication system has a plurality of mobile units performing inter-RAT-HO (and inter-freq-HO) for mutually different radio access technologies. In this situation, a mobile unit performs the monitoring and the measurement of the UTRA on one hand, while another mobile unit performs the monitoring and the measurement of the GSM. It is to be noted here that a mobile communication system using the radio access technology based on the UTRA and the GSM and on the 3GPP has mutually different frame length and frame structure, which involve mutually different method of measuring the reception quality and mutually different processing sequence, requiring mutually different minimum amount of time for processing. This embodiment therefore has: a mobile unit which is adapted to change in the measurement mode the measurement interval (feedback interval) for the instantaneous CQI values in the active mode; and a base station unit which is adapted to change the uplink resource allocation interval or the downlink resource allocation interval for the feedback of the instantaneous CQI values at the mobile unit; depending on the type of mobile communication system, to which the inter-RAT-HO (and the inter-freq-HO) is applied.

Figure 2:
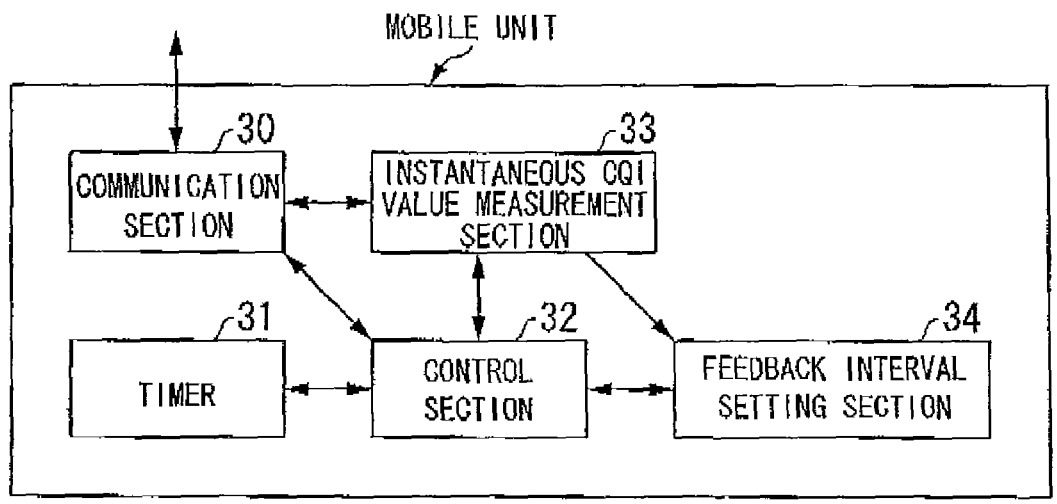
FIG. 2 schematically shows in blocks a mobile unit according to a first embodiment of the present invention.

Referring to FIG. 2 showing in blocks a mobile unit according to the first embodiment of the invention, the mobile unit has communication section 30, timer 31, control section 32, instantaneous CQI value measurement section 33, and feedback interval setting section 34.

Communication section 30 transmits to a base station unit the instantaneous CQI values measured at measurement section 33 through control section 32, and provides packet data to measurement section 33 and control section 32.

Measurement section 33 measures at predetermined points of time the instantaneous CQI values of data packets from communication section 30, to provide the measured instantaneous CQI values to feedback interval setting section 34 and control section 32.

Timer 31 provides, in response to instructions from control section 32, measured time signal to control section 32, which is for controlling the operation of various sections of the mobile unit, and for thereby providing various outputs from those various sections.

Feedback interval setting section 34 sets, on the basis of the measured instantaneous CQI values from measurement section 33 and the radio access technology-related information for handover from control section 32, the interval at which the measured instantaneous CQI values are transmitted and provides the interval-setting signal to control section 32. The mobile unit measures the interval which is set by the setting section 34 in the manner descried above, by timer 31 through control section 32, and transmits the instantaneous CQI value supplied from control section 32 to the base station unit.

Figure 3:
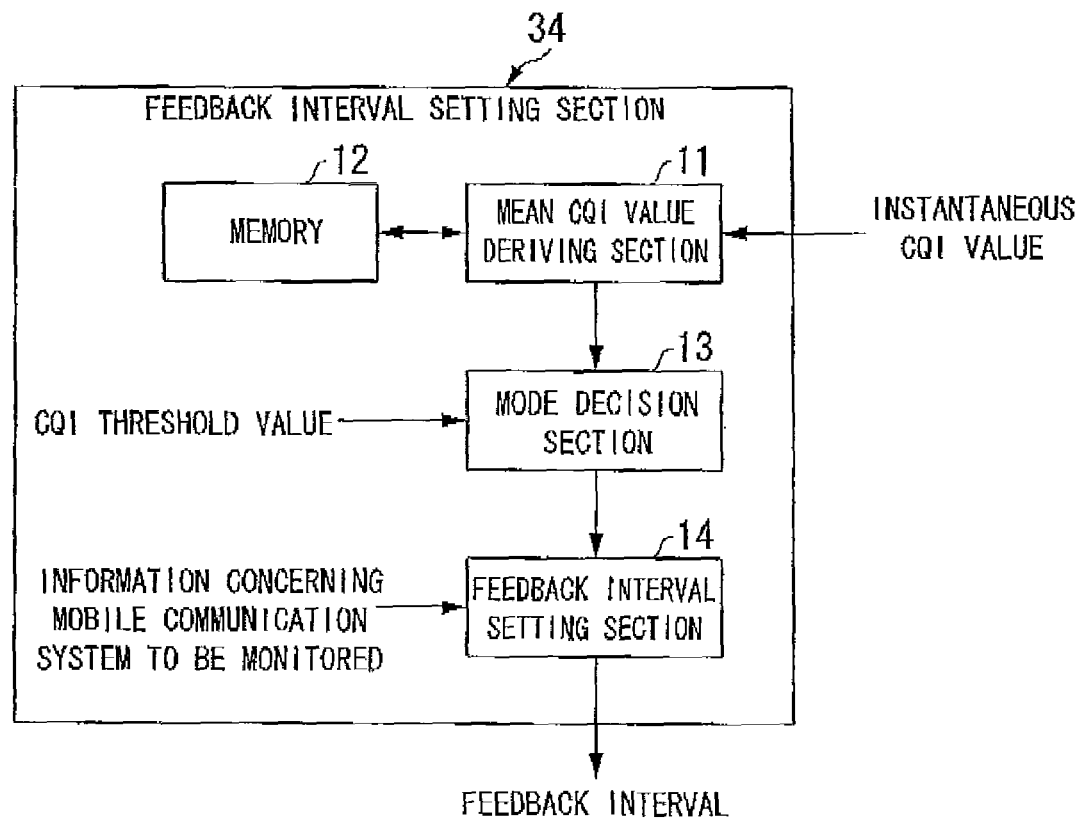
FIG. 3 schematically shows in blocks the structure of feedback interval setting section 34 (FIG. 2) in the first embodiment.

Referring to FIG. 3 showing in blocks the makeup of the feedback interval setting section 34 (FIG. 2) according to the first embodiment, the feedback interval setting section 34 has mean CQI value deriving section 11, memory 12, mode decision section (first mode decision section) 13, and feedback interval setting section (gap period setting section) 14.

Mean CQI value deriving section 11 provides mean CQI values in response to the instantaneous CQI values measured at the mobile unit. Memory 12 stores a plurality of instantaneous CQI values measured at a predetermined interval (or the average thereof).

Mode decision section 13 determines the switching between the ordinary mode and the measurement mode based on the mean CQI values from mean CQI value driving section 11 and a CQI threshold value. It is to be noted here that the CQI threshold value may be provided in advance from the base station unit or may be set in advance as a system parameter.

Feedback interval setting section 14 sets the feedback interval for the measured instantaneous CQI values, which interval sets the length of the gap period, in response to the result of the decision performed at mode decision section 13 and the system monitoring information including the type of radio access technology to be monitored by the mobile unit or the type of combination of the radio access technology to be monitored and the frequency band utilized. The radio access technology includes the UTRA, GSM and non-3GPP.

Referring to FIG. 4A showing a table showing the relationship between the radio access technology and the length of the gap period, it will be seen that the length of the gap period is decided in this embodiment, depending on the type of radio access technology to be monitored by the mobile unit.

More specifically, assuming that the UTRA is used as the radio access technology to be monitored by the mobile unit, the link resource allocation from the base station unit to the mobile unit is stopped to define the length T10 for the gap period. For the GSM and non-3GPP systems, the lengths T20 and T30 are similarly defined, respectively. The relationship shown in FIG. 4B may be used in place of those shown in FIG. 4A, to define the lengths of the gap period.

Referring to FIG. 4B showing the relationship among the radio access technology, the frequency band utilized, and the length of gap period, the length of gap period can be decided depending on the combination of the radio access technology to be monitored and the frequency band utilized.

More specifically, assuming that the radio access technology to be monitored by the mobile unit is the UTRA and that the frequency band utilized is in the f1 MHz band, the link resource allocation from the base station unit to the mobile unit is stopped to define the length of time T10, which provides the length of the gap period. On the other hand, assuming that the frequency band utilized is in the f2 MHz band, the length of time T10 is similarly defined.

Assuming further that the radio access technology to be monitored by the mobile unit is the GSM and that the frequency band utilized is in the f3 MHz band, the link resource allocation from the base station unit to the mobile unit is stopped, to thereby define the length of time T20, which provides the length of the gap period. Assuming the frequency band utilized is in the f4 MHz band, the length of time T21 is defined to provide the gap period of that length.

Assuming further that the radio access technology to be monitored by the mobile unit is a non-3GPP system and that the frequency band utilized is in the f5 GHz band, the link resource allocation is stopped to define the length of time T30, which provides the length of the gap period. Assuming that the frequency band utilized is in f3 GHz band, the length of time T31 is defined to provide the gap period of that length.

Figure 5:
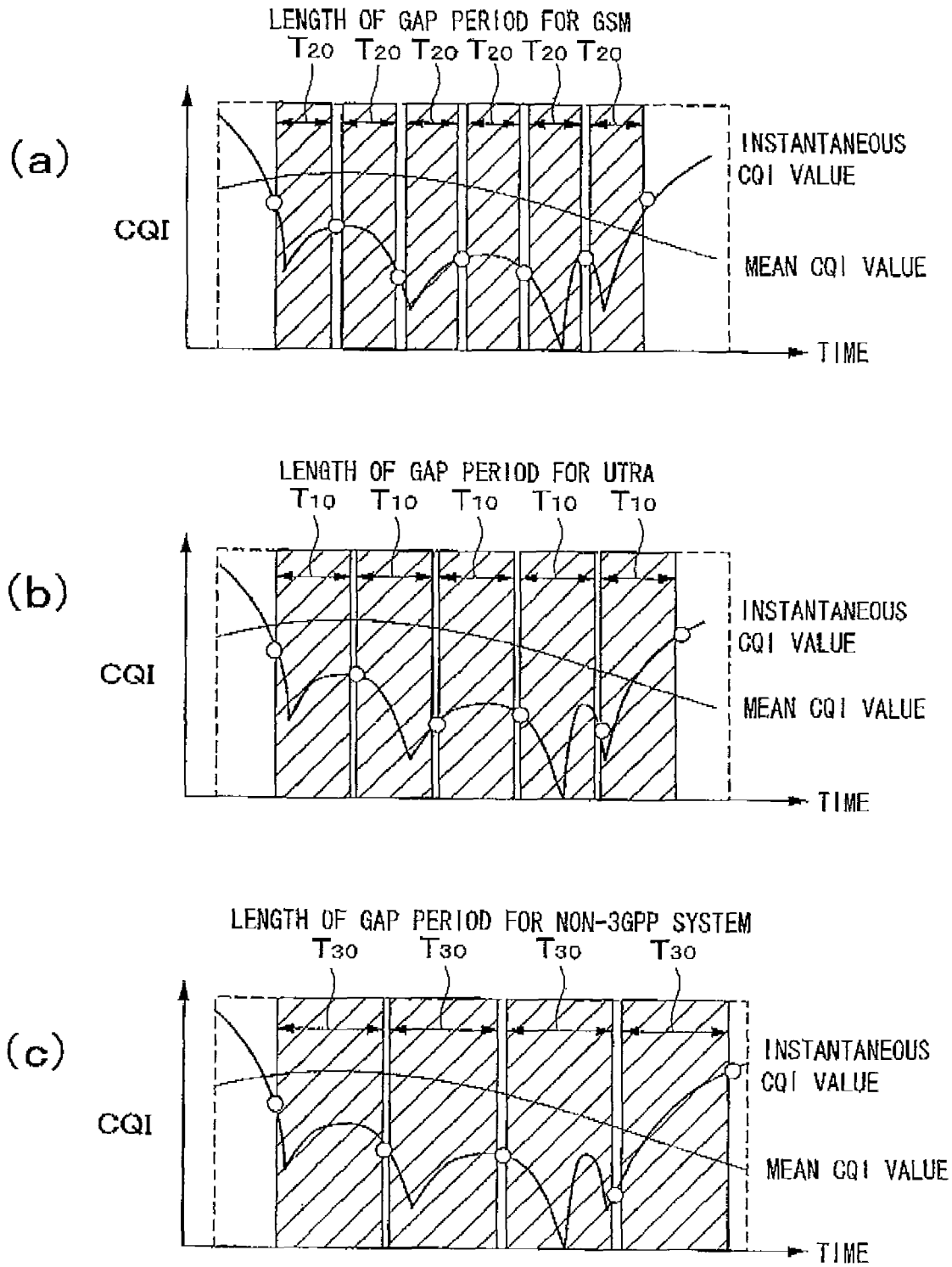
FIG. 5 shows illustration for describing the length of the gap period to be set by the base station unit in the first embodiment.

FIGS. 5(a) to 5(c) show illustration for describing the lengths of the gap period set by the base station unit of the first embodiment. When the radio access technology to be monitored by the mobile unit is the GSM, the base station unit sets the length of the gap period T20, which is optimal for monitoring a GSM-based base station unit, thereby to perform wireless communication with the mobile unit (FIG. 5(a) referred to).

When the radio access technology to be monitored by the mobile unit is the UTRA, the base station unit sets the length of the gap period T10, which is optimal for monitoring a UTRA-based base station unit, thereby to perform wireless communication with the mobile unit (FIG. 5(b) referred to).

When the radio access technology to be monitored by the mobile unit is a non-3GPP system, the base station unit sets the length of the gap period T30, which is optimal for the non-3GPP-based base station unit, thereby to perform wireless communication with the mobile unit (FIG. 5(c) referred to).

It will be noted that the illustration shown in FIGS. 5(a) to 5(c) assumes T20<T10<T30.

Mean CQI value deriving section 11 averages the instantaneous CQI values measured on the basis of the pilot signal contained in the downlink shared pilot channel packet data and the preceding instantaneous CQI values stored in memory 12 for a predetermined period of time, thereby to derive mean CQI values, and supplies the mean CQI values to mode decision section 13. Further incoming measured instantaneous CQI values are successively stored in memory 12 to be deleted after the lapse of a predetermined amount of time.

Mode decision section 13 compares the mean CQI value supplied from mean CQI value deriving section 11 with a CQI threshold value, which is set to provide switching between the ordinary mode and the measurement mode. The result of the decision performed at mode decision section 13 representing the mode information is then supplied to feedback interval selection section 14.

Feedback interval selection section 14, which stores in advance the feedback interval for the ordinary mode and a plurality of feedback intervals corresponding to various types of radio access technologies or the combination of such types of radio access technologies and frequencies utilized for the wireless communication, selects the feedback interval in response to the mode-related information supplied from mode decision section 13 and the information supplied from control section 32 (FIG. 2) concerning the radio access technology to be monitored or the combination of such radio access technology with the frequency band utilized for the wireless communication.

Figure 6:
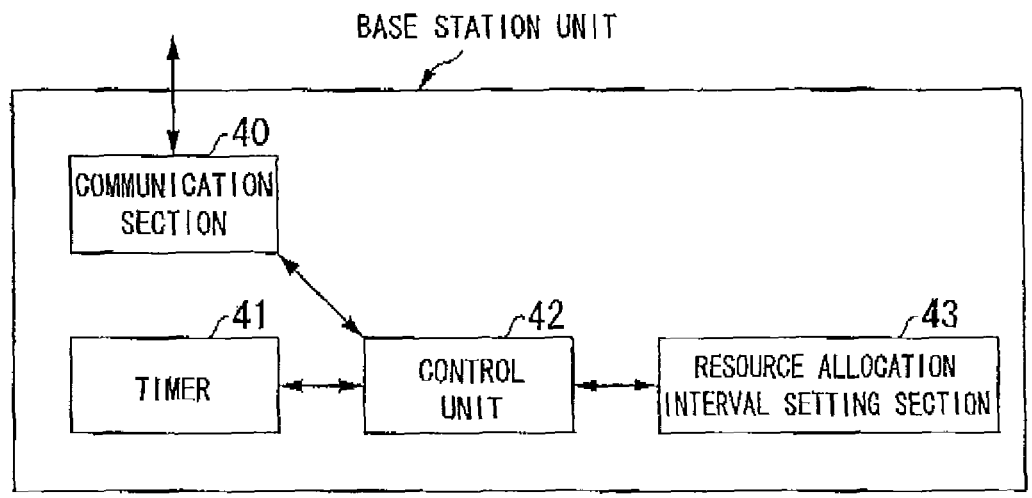
FIG. 6 shows in blocks the structure of the base station unit in the first embodiment.

Referring to FIG. 6, a base station unit shown in blocks therein has communication section 40, tuner 41, control section 42 and resource allocation interval setting section 43.

Communication section 40 receives the instantaneous CQI values measured at the measuring section 33 (FIG. 2) of the mobile unit, transmits and receives data packets to and from the mobile unit and provide such data to control section 42.

Timer 41 measures the lapse of time as instructed by control section 42 and provides the measured value to control section 42, which is for providing various control information to various sections of the base station unit.

Resource allocation interval setting section 43 sets the interval for the allocation of radio resources in response to the instantaneous CQI values from the mobile unit and to the mobile communication system-related information including such information concerning the radio access technology to be monitored or the combination of such radio access technology and the frequency band utilized for the wireless communication, and provides control section 42 with the information representative of the interval selected in the manner described above.

In response to the interval information supplied from resource allocation interval setting section 43 and to the time measurement at timer 41, the base station unit allocates the determined uplink radio resource to the mobile unit, thereby to receive the instantaneous CQI values from the mobile unit for the determined interval.

Figure 7:
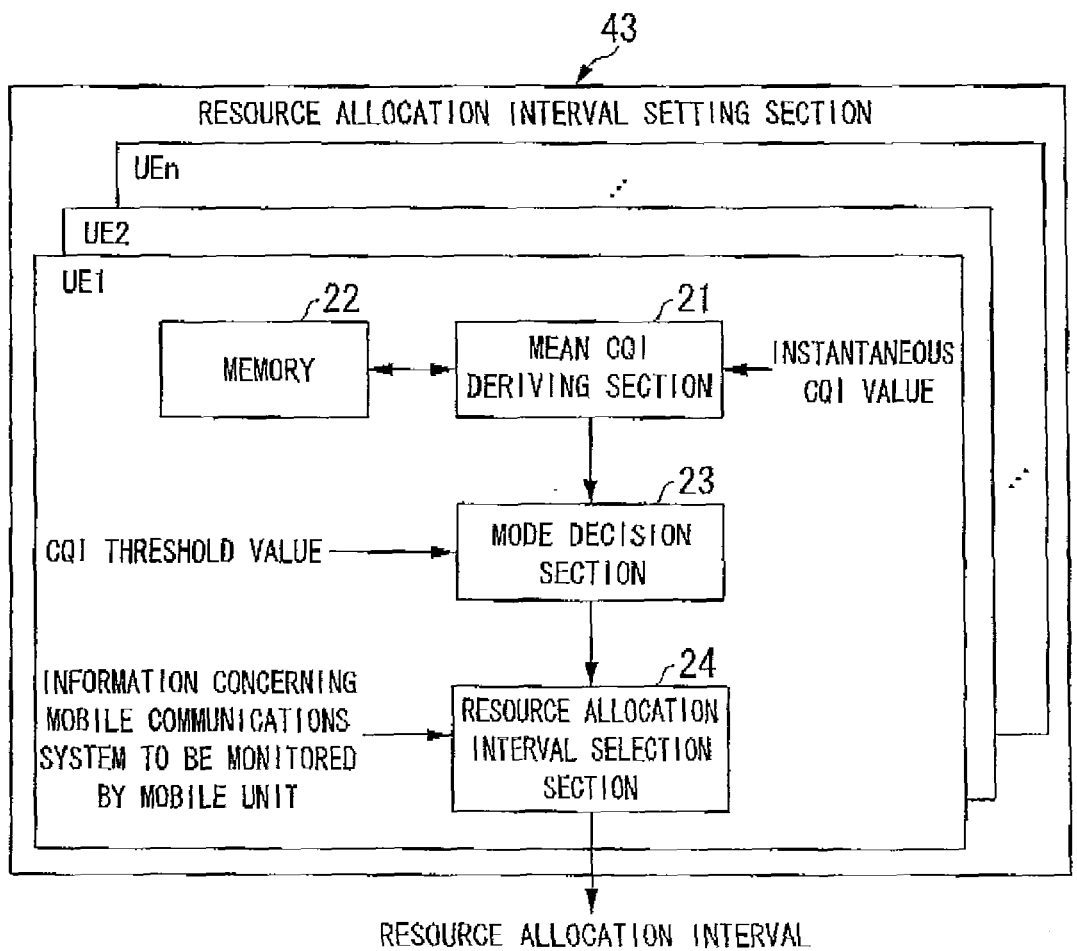
FIG. 7 shows in blocks the structure of resource assignment interval setting section 43 (FIG. 6).

Referring to FIG. 7, the resource allocation interval setting section 43 (FIG. 6) shown in blocks therein has mean CQI value deriving section 21, memory 22, mode decision section (second mode decision section) 23, and resource allocation interval selection sections (gap period setting sections) 43 equal in number to the mobile units (i.e., user equipment UE1, UE2, . . . UEn).

Mean CQI value deriving section 21 provides mean CQI values in response to the instantaneous CQI values supplied from the mobile unit. Memory 22 stores a sequence of instantaneous CQI values (or an average thereof) measured in a predetermined period of time.

Mode decision section 23 derides, based on the mean CQI value and the CQI threshold value, on switching between the ordinary mode and the measurement mode. It is to be noted here that the CQI threshold value is set in advance. Resource allocation interval selection section 24 selects the resource allocation interval, in response to the decision performed at mode decision section 23 and to the information concerning the radio access technology to be monitored by the mobile unit or the combination of such radio access technology and the frequency band utilized for the wireless communication, and supplies the interval-related information to control section 42.

Mean CQI value deriving section 21 provided in each of the mobile units averages the instantaneous CQI values fed back from the mobile unit and the preceding instantaneous CQI values already stored in memory 22 for a predetermined period of time, thereby to provide mean CQI values, which are then supplied to mode decision section 23. Newly incoming instantaneous CQI values are stored in memory 22 for a predetermined period of time, beyond which the stored data (not contributive to the averaging of the incoming and stored data) are deleted.

Mode decision section 23 compares the mean CQI values from deriving section 21 with the CQI threshold value, and provides to resource allocation interval selection section 24 the mode-related information for switching between the ordinary mode and the measurement mode.

Resource allocation interval section 24, which stores in advance the information representative of the resource allocation intervals for the ordinary mode and of the resource allocation intervals in the measurement mode for various radio access technologies or for the combination of such radio access technologies and the frequency band utilized, selects the resource allocation interval for the feedback of the uplink instantaneous CQI values, in response to the mode-related information supplied from mode decision section 23 and the information supplied from the mobile unit through control section 42 (FIG. 6) relating to the radio access technology to be monitored or the combination of such radio access technology and the frequency band utilized for the wireless communication.

Figure 8:
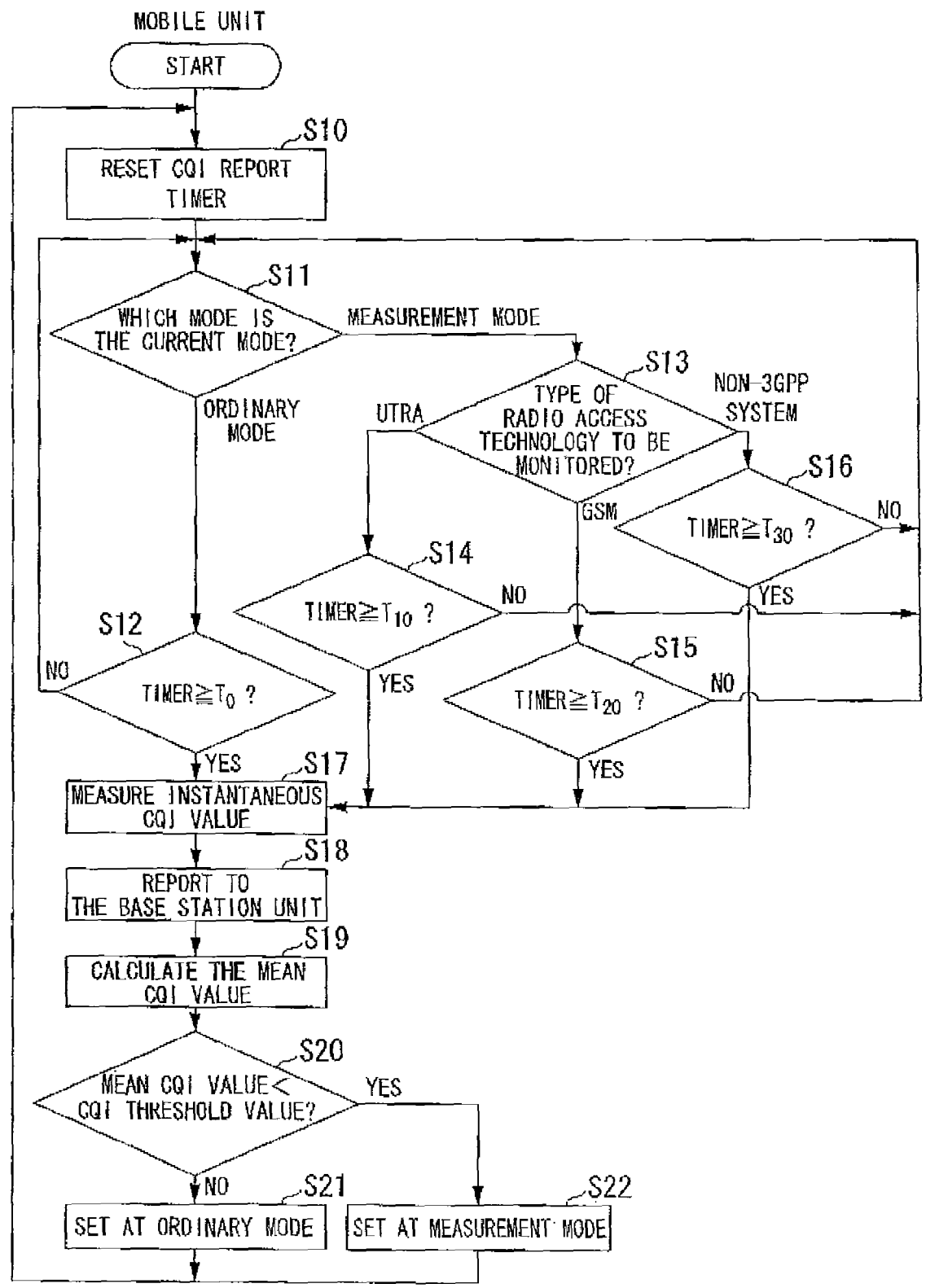
FIG. 8 shows a flow chart for the processing performed at feedback interval selection unit 14 of the mobile unit in the first embodiment.

Referring to FIG. 8 showing a flow chart for the processing performed at feedback interval selection section 14 of the mobile unit according to the first embodiment of the invention, the processing will now be described assuming that the mobile unit is in the measurement mode for the inter-RAT-HO (and the inter-freq-HO). Description will also be given assuming that one of the UTRA, GSM and non-3GPP systems is used as radio access technology for the mobile unit. Also, it is assumed here that the frequency band is utilized for the wireless communication based on each of the radio access technologies.

Initially, mean CQI value deriving section 11 resets the timer for reporting the CQI value (step S10). Mode decision section 13 then determines which mode the mobile unit is currently in, the ordinary mode or the measurement mode (step S11). If the mobile unit is in the ordinary mode, the decision is performed on whether the timer is at T0 (the CQI interval in the ordinary mode) or more (step S12). If the timer is above T0 at step S12, the processing proceeds to step S17. On the other hand, if the timer is below T0 at step S12, the processing proceeds to step S11.

If the mobile unit is in the measurement mode at step S11, it is decided on whether the type of the radio access technologies to be monitored is the UTRA, the GSM or the non-3GPP system (step S13).

If the type of the radio access technology is determined at step S13 to be the UTRA, the decision is performed on whether the timer is above or below T10 (CQI report interval in the UTRA measurement mode) (step S14). If the timer is above T10 at step S14, the processing proceeds to step S17. On the other hand, if the timer is below T10 at step S14, the processing proceeds to step S11.

When the type of the radio access technology to be monitored is the GSM at step S13, the decision is performed on whether the timer is above T20 or not (step S15). If the timer is above T20 at step S15 (the CQI report interval for the GSM system measurement mode), the processing proceeds to step S17. On the other hand, if the timer is below T20 at step S15, the processing proceeds to step S11.

When the type of the radio access technology to be monitored is a non-3GPP system, the decision is performed on whether the timer is above T30 (the CQI report interval for the non-3GPP system measurement mode) or not (step S16). If the timer is above T30 at step S16, the processing proceeds to step S17. If the timer is below T30 at step S16, the processing proceeds to step S11.

Instantaneous CQI value measuring section 33 measures the instantaneous CQI values on the basis of the CQI report interval for each of the ordinary and measurement modes (step S17), and the measured instantaneous CQI values are fed back by communication section 30 to the base station unit, thereby to perform the report (step S18). Mean CQI value deriving section 11 then calculates mean CQI values, using the instantaneous CQI values derived at step S17 and those stored in memory 12 (step S19).

Mode decision section 13 then determines whether the mean CQI values are smaller than the CQI threshold value or not (step S20). If the mean CQI value is determined, at step S20, to be greater than the CQI threshold value, the mobile unit is set at the ordinary mode (step S21). If the mean CQI value is determined at step S20 to be smaller than the CQI threshold value, the mobile unit is set at the measurement mode (step S22). It will be noted here that if the decisions at step S14, S15 and S16 are "No," the processing may proceed to step S13 rather than to step S11.

As described above referring to FIG. 8, feedback interval selection section 14 in the mobile unit of the present embodiment selects, at steps S13 and steps S14-S16, CQI report intervals T10, T20 and T30 (the lengths of the gap period), depending on the type of the radio access technology to be monitored or the type of combination of such radio access technology and the frequency band utilized for the wireless communication. It is noted here that the gap period means the period of time in which the allocation of link resources from the base station unit to the mobile unit is stopped to permit the mobile unit to monitor the base station unit which is in communication therewith. It is during the gap period that the mobile unit monitors adjacent base station unit in communication therewith.

Since the mobile unit of the present invention selectively sets the length of the gap period depending on the type of the radio access technology to be monitored or on the type of combination of such radio access technology and the frequency band utilized for the wireless communication, optimal length of gap period can be selected.

Figure 9:
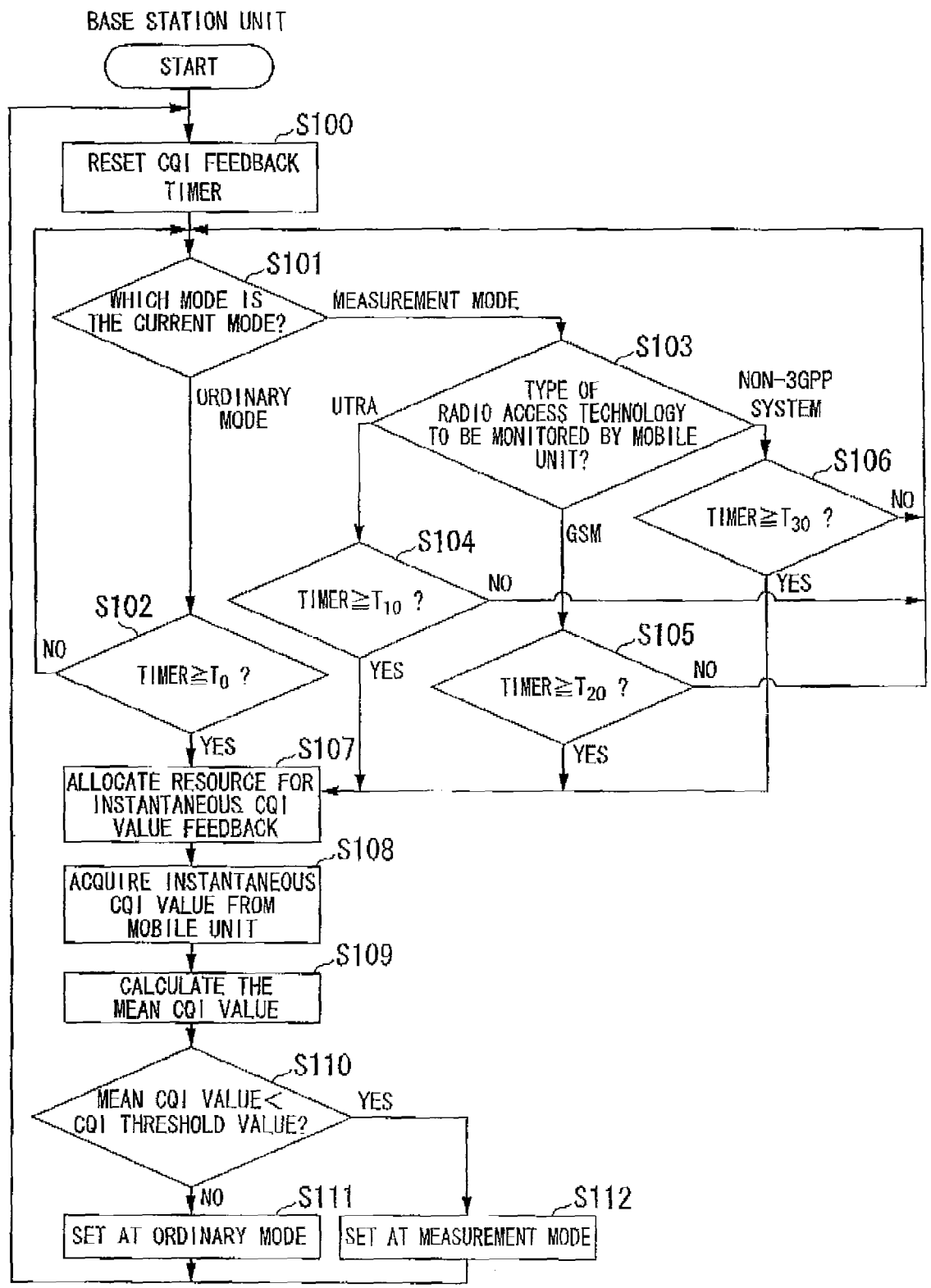
FIG. 9 shows a flow chart for the processing performed at resource allocation interval selection section 24 of the base station unit in the first embodiment.

Referring to FIG. 9 showing a flow chart for the processing performed at resource allocation interval selection section 24 of the base, station unit according to the first embodiment, the operation of the resource allocation interval selection 24 will now be described for the measurement mode of the inter-RAT-HO (and the inter-freq-HO). Description will also be given for the cases where one of the UTRA, GSM and non-3GPP systems is used in the base station unit as an alternative radio access technology. In addition, description will be given assuming that one frequency band is utilized for the wireless communication based on the various radio access technologies.

Initially, mean CQI deriving section 21 resets the CQI feedback timer (step S100). Mode decision section 23 then decides whether the base station unit is currently in the ordinary mode or in the measurement mode (step S101). When the processing at step S101 shows that the base station unit is in the ordinary mode, decision is performed on whether the timer is above T0 (the resource allocation interval for the CQI feedback in the ordinary mode) or not (step S102). If the processing at step S102 shows that the timer is above T0, the processing proceeds to step S107. On the other hand, if the timer is below T0 at step S102, the processing proceeds to step S101.

If the processing at step S101 shows that the base station unit is in the measurement mode, decision is performed on whether the type of the radio access technology to be monitored by the mobile unit for monitoring and measurement is the UTRA, GSM or non-3GPP system (step S103). If it is determined at step S103 that the radio access technology to be monitored is the UTRA, decision is performed on whether the timer is above T10 (resource allocation interval for the CQI feedback in the UTRA measurement mode) or not (step S104). If the timer is above T10 at step S104, the processing proceeds to S107. On the other hand, if the timer is below T10 at step S104, the processing proceeds to step S101.

When the type of the radio access technology to be monitored is determined to be the GSM at step S103, decision is performed on whether the timer is above T20 or not (step S105). If the timer is above T20 (the resource allocation interval for CQI feedback in the measurement mode of GSM) at step S105, the processing proceeds to step S107. On the other hand, if the timer is below T20 at step S105, the processing proceeds to step S101.

If the type of the radio access technology to be monitored at step S103 is a non-3GPP system, decision is performed on whether the timer is above T30 (the resource allocation interval for CQI feedback in the measurement mode of non-3GPP system) or not (step S106). If the timer is above T30 at step S106, the processing proceeds to step S107. On the other hand, if the timer is below T30 at step S106, the processing proceeds to step S101.

The uplink resource for the instantaneous CQI value feedback is then allocated on the basis of the resource allocation interval for the CQI feedback in each of the modes (step S107), thereby to acquire the instantaneous CQI value fed back from the mobile unit (step S108). Mean CQI value deriving section 21 then calculates the mean CQI value, in response to the instantaneous CQI values acquired at step 108 and the instantaneous CQI value stored in memory 22, and have the memory 22 store the instantaneous CQI values in memory 22, while allowing the old instantaneous CQI values to be deleted from memory 22 (step S109).

Mode decision section 23 then performs a decision on whether the mean CQI value is smaller than the CQI threshold value (step S110). When the mean CQI value is determined at step 110 to be greater than the CQI threshold value, the base station unit is set in the ordinary mode (step S111). On the other hand, if the mean CQI value is smaller than the CQI threshold value at step S110, the base station unit is set in the measurement mode (step S112). If the decision at steps S104, S105 and S106 is No, the processing can proceed to step S103 rather than to step S101.

As described above referring to FIG. 9, the resource allocation interval selection section 24 in the base station unit of this embodiment sets, at steps S103 and steps S104 to S106, the resource allocation intervals T10, T20 and T30 (the lengths of the gap period) for the measurement-mode CQI feedback at the mobile unit, depending on the type of radio access technology to be monitored by the mobile unit.

It will be seen from the foregoing description that, in the mobile communication system of this embodiment, the resource allocation interval selection section 24 sets, at steps S103 and steps S104 to S106 of FIG. 9, the resource allocation intervals T10, T20 and T30 (the lengths of the gap period) for the measurement mode CQI feedback at the mobile unit, depending on the type of radio access technology to be monitored by the mobile unit. This makes it possible for the base station unit to set appropriate lengths of the gap period depending on the radio access technology to be monitored by the mobile unit, thereby to prevent the inefficient utilization of the link resource for the wireless communication between the mobile units and the base station units.

In addition, in, the mobile communication system of this embodiment, the mode decision section 13 of the mobile unit decides at step S20 of FIG. 8 on whether the measurement mode for enabling the monitoring of an adjacent base station, unit or the ordinary mode for not monitoring the adjacent base station unit should be selected, while in the mode decision section 23 of the base station unit determines at step S110 of FIG. 9 on whether the mobile unit is in the measurement mode or in the ordinary mode depending on the instantaneous CQI value fed back from the mobile unit. It is to be noted here that the adjacent base station unit mentioned above means a base station unit other than that which is now in communication with the present mobile unit.

It will be seen in the description given above that the mobile unit and the base station unit employed in the first embodiment are adapted to control the interval of the measurement of the instantaneous CQI values by feeding back the instantaneous CQI values from the mobile unit to the base station unit, thereby to share those CQI values. In other words, decision is performed at both the mobile unit and the base station unit on whether it is the ordinary mode or the measurement mode. Alternatively, the mode decision section 13 may be provided on the mobile unit so that the decision may be communicated to the base station unit, thereby to permit the latter to grasp the state of mode at the mobile unit. More specifically, mode decision section 13 of the mobile unit may decide at step S20 of FIG. 8 on whether the measurement mode for enabling the adjacent base station unit to be monitored or the ordinary mode for not enabling such monitoring, so that the resource allocation interval selection section 24 of the base station unit may set the resource allocation interval for the measurement made CQI value feedback on the basis of the selection performed at the mode decision section 13 and fed back from the mobile unit.

Alternatively, the mode decision section 23 may be provided only on the base station unit side, so that the mode decision performed at mode decision section 23 may be communicated to the mobile unit, thereby to permit the mode of the latter to be set on the basis of the communicated result of the mode decision.

The base station unit may alternatively send to the mobile unit information concerning the radio access technology used by the adjacent base station unit or the combination of such radio access technology and the frequency band utilized for the wireless communication, thereby to enable the mobile unit to focus in advance on the mobile communication system in which the mobile unit performs the inter-RAT-HO (and inter-freq-HO). In that case, the mobile unit can be aware that in the adjacent base station units there are no use of the radio access technology which the mobile unit corresponds, which makes it possible for the mobile unit to avoid unnecessary monitoring or measurement, thereby to reduce power consumption. More specifically, the base station unit may inform mobile units located in its cell that only UTRA is present at the adjacent base station unit, thereby to prevent those mobile units adapted to the GSM from performing unnecessary monitoring or measurement.

It is to be noted here that the resource allocation interval setting sections 43 at the base station unit of the first embodiment need not be equal in number to the mobile units. Various sections can be shared by a plurality of mobile units, with the timing for the processing staggered for the plurality of the mobile units.

Second Embodiment

The second embodiment of the present invention is a mobile communication system in which a mobile unit is capable of performing the inter-RAT-HO (and inter-freq-HO) to a plurality of mutually different mobile communication systems, and in which the base station unit simultaneously sets a plurality of uplink resource allocation intervals or downlink resource allocation intervals for the instantaneous CQI value feedback without being informed by the mobile unit about the type of radio access technology to be monitored and measured by the mobile unit. The makeup of base station unit according to the second embodiment is similar to that of the first embodiment (FIGS. 6 and 7 referred to), with only the processing being different.

Figure 10:
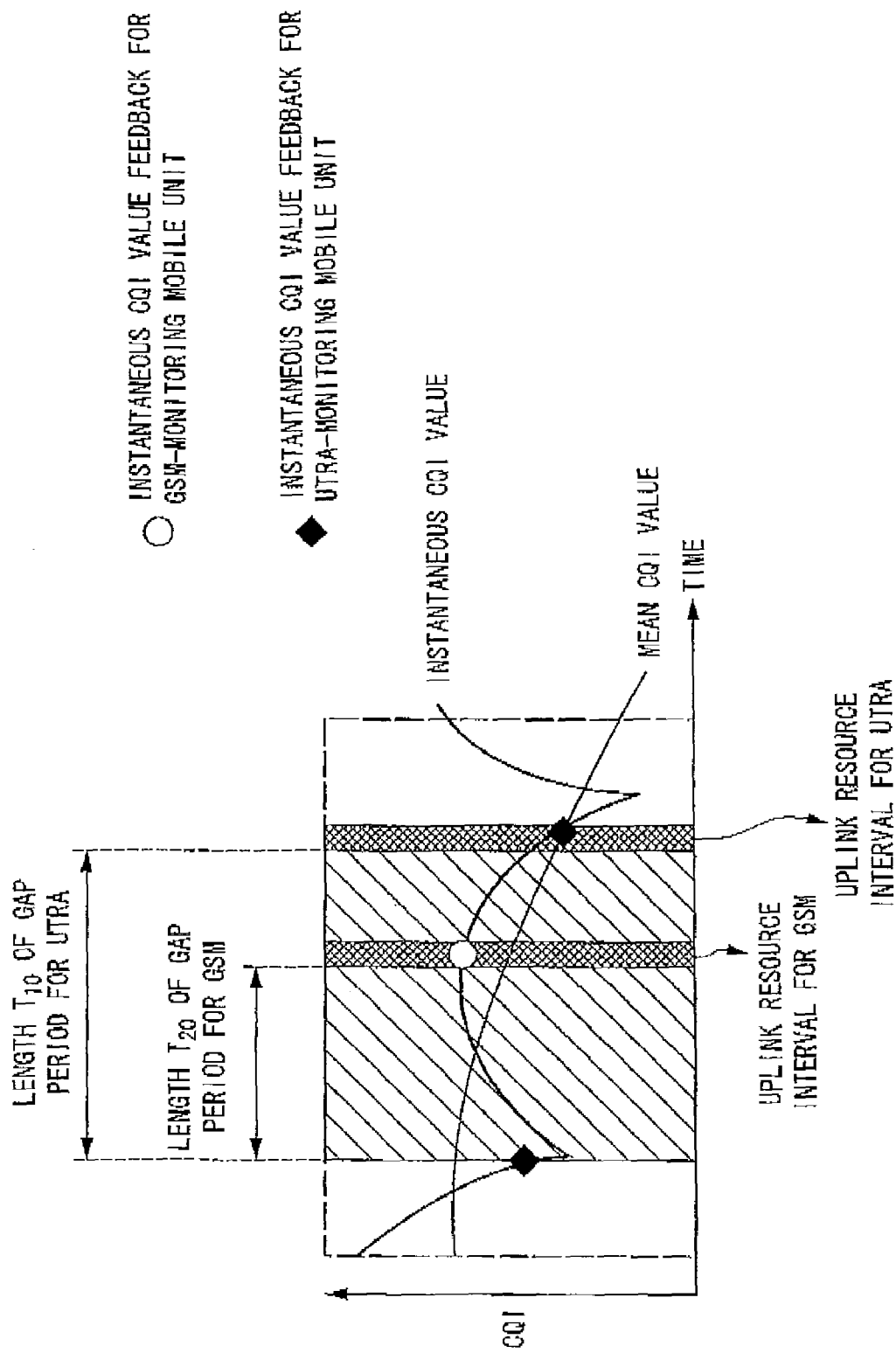
FIG. 10 shows an illustration for describing the resource allocation interval in the second embodiment of the invention.

Referring to FIG. 10 showing an illustration for describing the resource allocation interval in the base station unit of the second embodiment, the base station unit determines that the instantaneous CQI value fed back from the mobile unit is smaller than the mean CQI value and decides on the start of the monitoring and measuring by the mobile unit of other radio access technologies to achieve the inter-EAT-HO (and the inter-freq-HO). The base station unit then allocates, to the mobile unit capable of performing the inter-RAT-HO (and the inter-freq-HO), a plurality of uplink resources for the feedback. It is assumed here that a plurality of uplink resources are allocated for the monitoring and measuring is shorter for the GSM system than for the UTRA. The mobile unit then feeds back to the base station unit the instantaneous CQI value using the uplink resources for the GSM system if the monitoring and measuring for the GSM system is performed. In contrast, the mobile unit feeds back the instantaneous CQI value to the base station unit using the uplink resources for the UTRA system if the monitoring and measuring for the UTRA system is performed.

It is to be noted here that the allocation of a plurality of the uplink resources mentioned above is intended to mean a scheduled allocation rather than the actual setup of frames responsive to the determination of the measurement mode, because the time for assigning the plurality of the uplink resources is actually different and because there is no uplink resource allocation for the gap period. The base station unit performs, at the scheduled allocation timing, the resource allocation for the whole of the frequency bands, taking into consideration other mobile units. Thus, the uplink resources are allocated for the feedback of instantaneous CQI values.

In the mobile communication system of this embodiment, in which the mobile unit is capable of performing the inter-RAT-HO (and inter-freq-HO) for a plurality of mutually different radio access technologies, the feedback of the instantaneous CQI value is performed at appropriate timings without the mobile unit informing the base station unit about the type of radio access technology to be monitored and measured.

The second embodiment may be modified in such a manner that the base station unit resets, with respect to the plurality of the uplink resource allocation intervals simultaneously set by the base station unit, the gap period set at a longer value than a shorter gap period at which the base station unit receives the instantaneous CQI value from the mobile unit, and that the base station unit continuously sets the gap period which had been set longer than the shorter gap period if the instantaneous CQI value fails to be received at the shorter gap period, without resetting the allocated gap period.

Referring to FIG. 10, the base station unit resets the gap period of length T10 for the UTRA system and allocates the resources again to mobile units including other ones if it receives from the mobile unit the instantaneous CQI value with the gap period of the length T20 for the GSM system, maintains the gap period of length T10 for the UTRA system allocated in the manner mentioned above and then receives from the mobile unit the instantaneous CQI value with the gap period of the length T10 for the UTRA system if the instantaneous CQI value fails to be received from the mobile unit with the gap period of the length T20.

Figure 11:
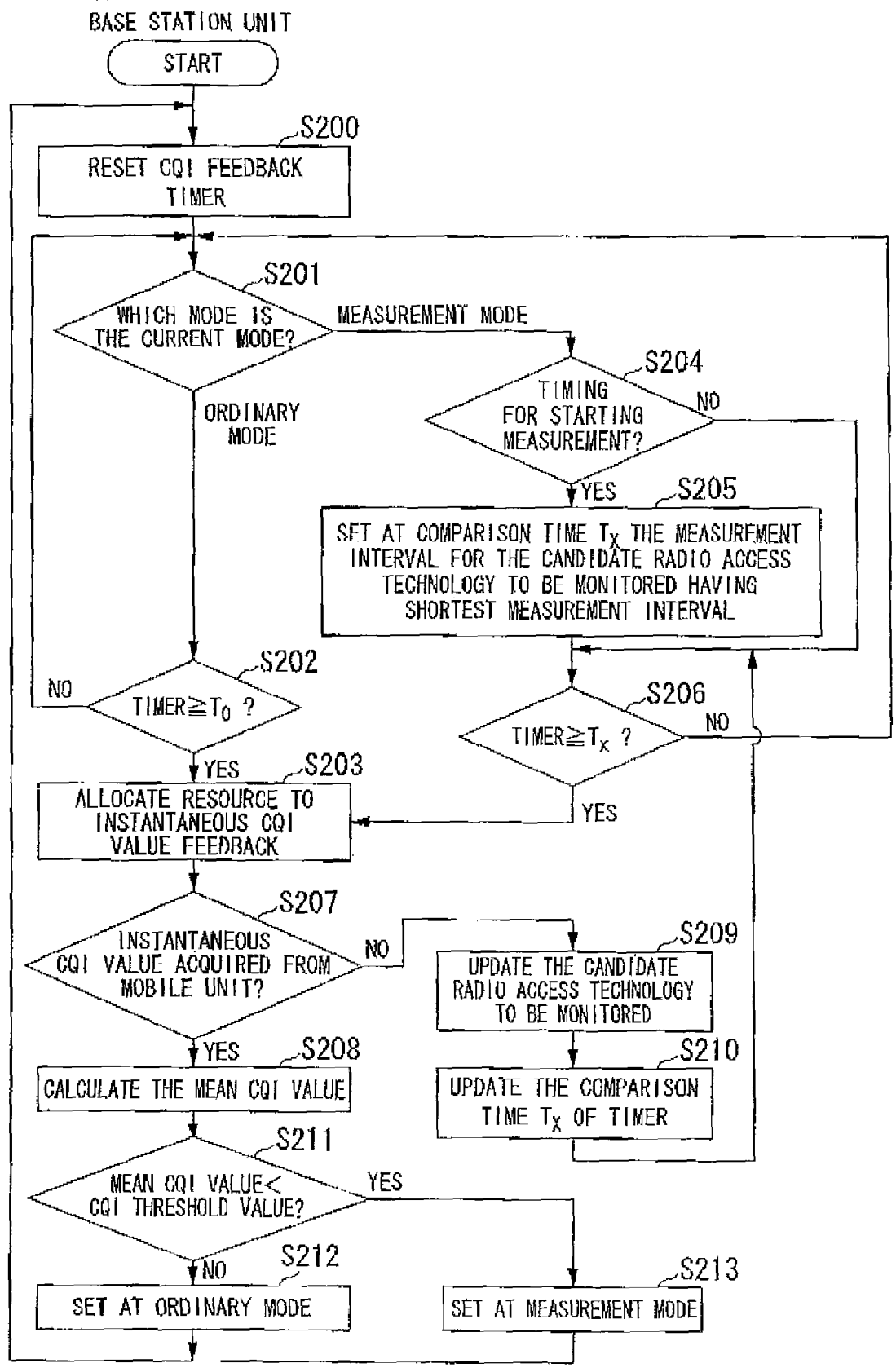
FIG. 11 shows a flow chart for the processing performed at the resource allocation interval selection section 24 of the base station in the second embodiment.
Figure 12:
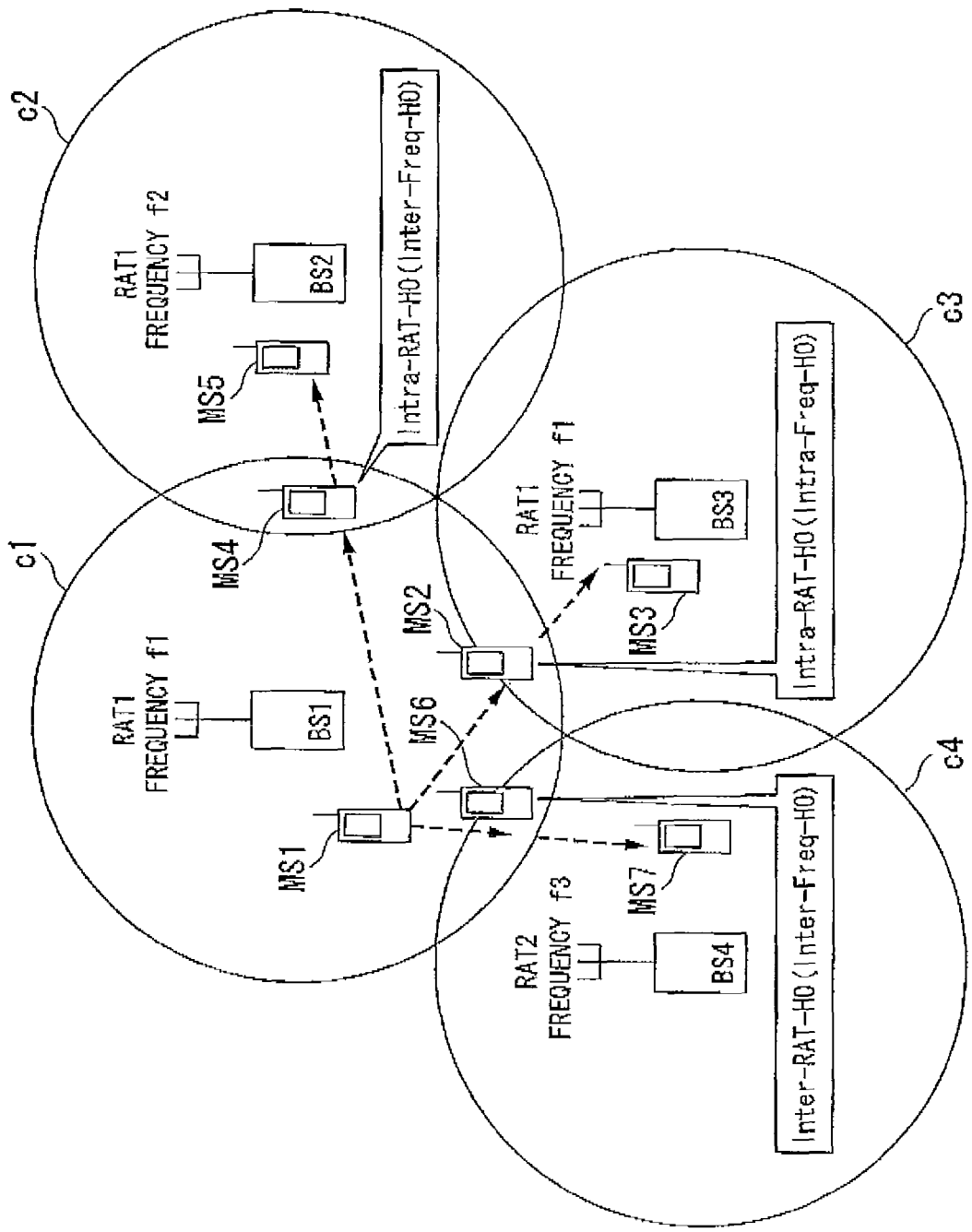
FIG. 12 illustrates the handover processing to be performed while the mobile unit is in motion.
Figure 13:
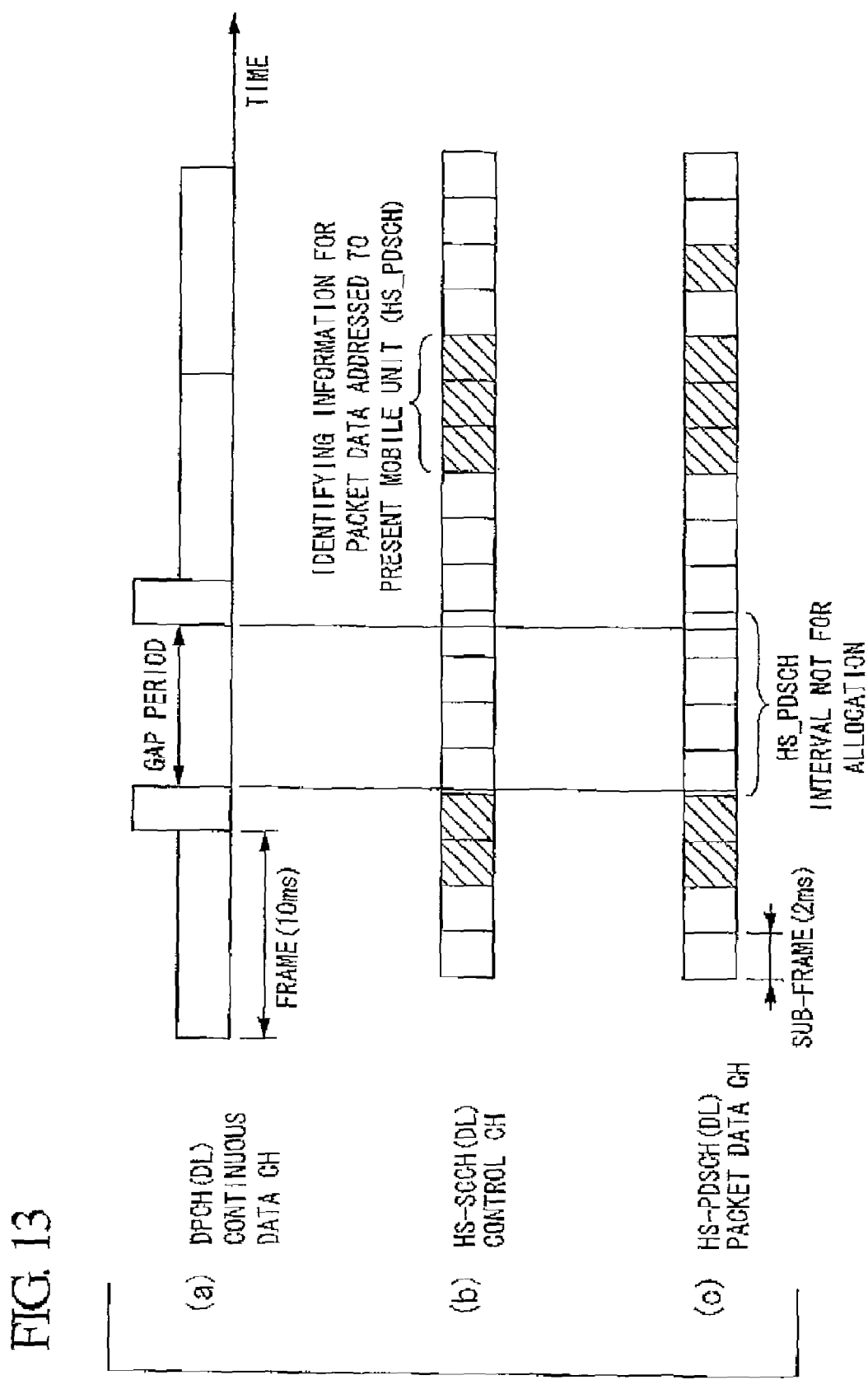
FIG. 13 shows an example of a dedicated channel transmitted from the base station unit to the mobile unit.
Figure 14:
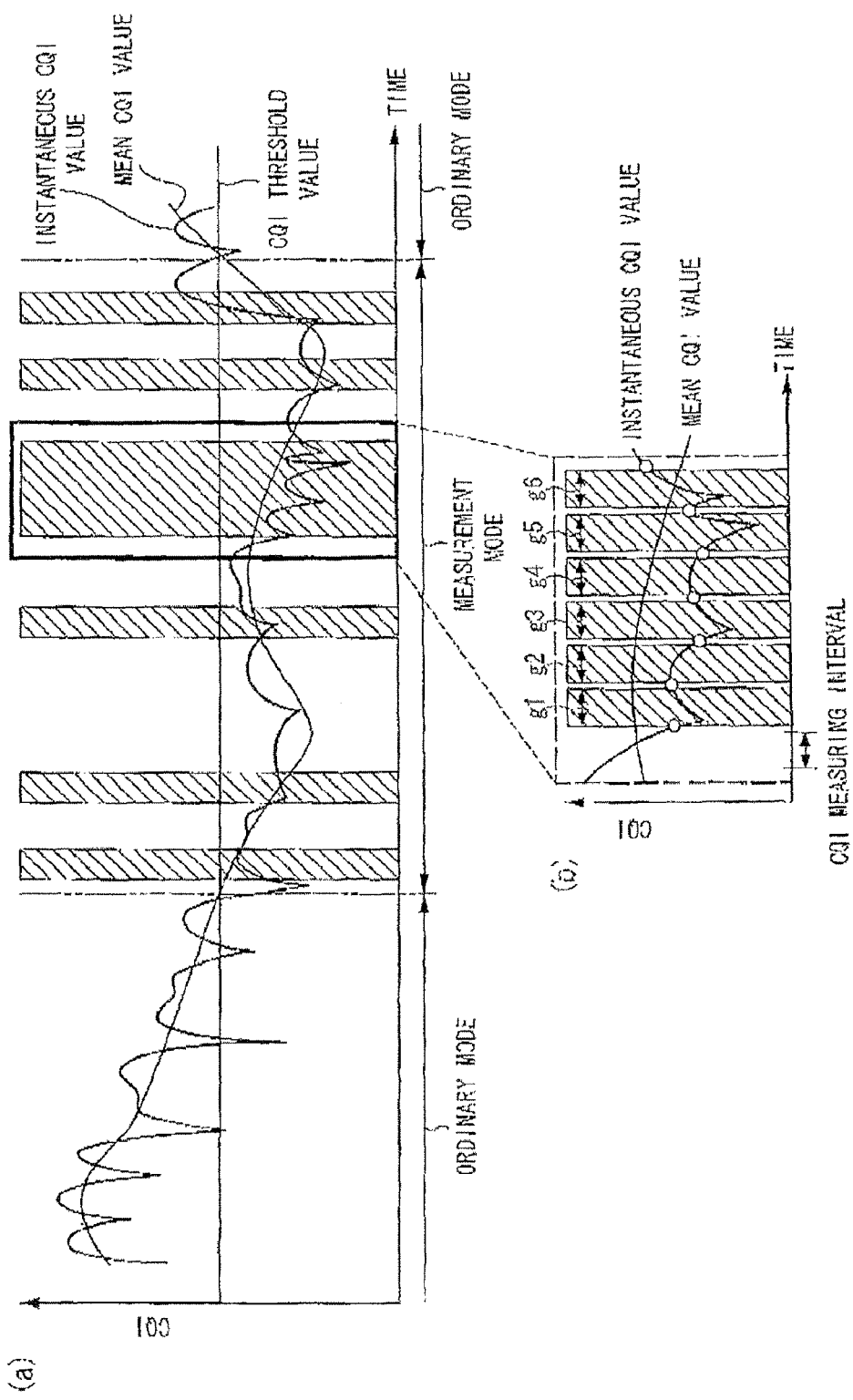
FIG. 14 shows an illustration for describing a conventional method of controlling the gap period.

FIG. 11 shows a flow chart for describing the processing performed at resource allocation interval selection section 24 of the base station unit according to the modified makeup of the second embodiment of the invention.

Initially, mean CQI value deriving section 21 resets the CQI feedback timer (step S200). Mode decision section 23 then determines whether the base station unit is currently in the ordinary mode or in the measurement mode when viewed from the mobile unit (step S201). If step S201 determines that the base station unit is in the ordinary mode, decision is performed on whether the timer is above T0 (the resource allocation interval for the ordinary mode CQI feedback) or not (step S202). If step S202 determines that the timer is above T0, the processing proceeds to step S203. On the other hand, if the timer is below T0 at step S202, the processing proceeds to step S201.

If the base station unit is in the measurement mode at step 201, determination is performed on the start timing for the measurement mode (step S204). If the determination at step S204 shows the start timing for the measurement mode, the resource allocation interval setting section 43 sets at timer comparison time TX the measurement interval for radio access technology to be monitored, which involves the shortest measurement interval (step S205). This makes it possible to simultaneously set a plurality of gap period lengths for the instantaneous CQI value (reception quality indicator) feedback, in case where the mobile unit is adapted to a plurality of types of radio access technologies different from such radio access technology used for the base station unit currently in communication with the mobile unit. More specifically, if the base station unit receives from the mobile unit the instantaneous CQI value with a shorter gap period length among the plurality of simultaneously set gap period lengths, the base station unit resets the gap periods set at longer value than the shorter value, while the base station unit continues with setting the gap period at a value longer than the shorter value if the base station unit does not receive from the mobile unit the instantaneous CQI value with the shorter gap period.

If the start timing for the measurement mode is not determined at step S204, the processing proceeds to step S206.

It is determined at step S206 whether timer is above TX (the resource allocation interval, which depends on the type of the radio access technology to be monitored) or not (step S206). If the timer is determined at step S206 to be above TX, the processing proceeds to step S203. If the timer is determined at step S206 to be below TX, the processing proceeds to step S201. The uplink resource for the instantaneous CQI value feedback is then assigned to the mobile unit, depending on the resource allocation interval for the CQI feedback for each of the modes (step S203).

It is then determined whether the instantaneous CQI value has been acquired from the mobile unit (step S207). If the acquisition of the instantaneous CQI value is determined at step S207, the processing proceeds to step S208. If the acquisition of the instantaneous CQI value is not determined at step S207, the candidate radio access technology for the mobile unit is updated (step S209), with the timer comparison time TX also being renewed correspondingly to the measurement time for the updated candidate radio access technology to be monitored (step S210), preceding to step S206. At step S208, mean CQI value deriving section 21 calculates the mean CQI values based on the instantaneous CQI values acquired at step S207 and those CQI values stored in memory 22, while letting memory 22 store the instantaneous CQI values and delete the old CQI values stored for a predetermined amount of time.

Mode decision section 23 then determines whether the mean CQI value is smaller than the CQI threshold value or not (step S211). If the mean CQI value is above the CQI threshold value at step S211, the base station unit is set in the ordinary mode (step S212). On the other hand, if the mean CQI value is determined at step S211 to be below the CQI threshold value, the base station unit is set in the measurement mode (step S213).

As described above, the second embodiment and its modification, make it possible for the mobile unit to feed back the instantaneous CQI values at appropriate tunings, without informing the base station unit which one of a plurality of types of the radio access technologies is going to be monitored and measured by the mobile unit, in case where the mobile unit is capable of performing the inter-KAT-HO (and the inter-freq-HO) on a plurality of mutually different radio access technologies. Thus, the second embodiment and its modification provide higher efficiency of the use of resources by other mobile units by avoiding redundant allocation of resources.

While it is assumed in the second embodiment that the mobile unit sets gap periods for a plurality of mutually different radio access technologies, the gap period setting can be performed, as in the case of the first embodiment, for a plurality of mutually different combinations of the radio access technologies and the frequencies utilized for the wireless communication.

Alternatively, the base station unit may transmit to the mobile unit information concerning the radio access technologies to be used by adjacent base station units, so that the mobile unit may be able to focus in advance on the radio access technology of the wireless communication system into which the mobile unit performs the inter-RAT-HO (and the inter-freq-HO). In this arrangement, the base station unit has only to set the gap period for the mobile unit to perform the monitoring and measurement for the focused-on radio access technology, thereby to avoid redundant resource allocation. Since the mobile unit is aware in this situation of the absence of the use of particular radio access technology, the monitoring and measurement of those radio access technologies can be avoided to reduce further power consumption.

More specifically, the base station unit informs the mobile units located in the cell formed thereby that there are use of the UTRA and non-3GPP radio access technology in the adjacent base station units, so that the mobile unit may focus on the UTRA- or non-3GPP-based system as candidate for the inter-RAT-HO (and inter-freq-HO). Thus, the mobile unit which is capable of performing the inter-RAT-HO (and the inter-freq-HO) for a plurality of radio access technology-based mobile communication systems, is put restrictions on the inter-RAT-HO for the GSM (and the inter-freq-HO) system, while preventing itself from the monitoring and measuring for the GSM system.

In the second embodiment and its modification described above, the mobile unit sets the gap period for the monitoring and the measurement of the radio access technology. The base station unit can therefore avoid the setting for the GSM system of the intervals for the uplink resource allocation for the instantaneous CQI value feedback or the downlink resource allocation. Redundant resource allocation can therefore be prevented.

It will be noted here concerning the embodiment described above that the processing for the setting of the instantaneous CQI value feedback interval in the measurement mode mobile unit, the uplink resource allocation interval for the base station unit, or the downlink resource allocation interval are principally aimed at the setting of the instantaneous CQI value feedback interval at the mobile unit, the uplink resource allocation interval or the downlink resource allocation interval at the base station unit to be performed by the autonomous gap control method. In other words, the above processing is aimed at providing appropriate gap periods depending on the mobile communication system to be monitored by the mobile unit. Thus, even in the measurement mode, the mobile unit instantaneous CQI value feedback interval for the period in which gap periods are not provided, the base station unit uplink resource allocation interval, or the downlink resource allocation interval may be set at a value similar to those for the provision of the gap period, a value similar to those for the ordinary mode or any other arbitrary values.

It will also be noted that the programs to function on the base station unit or the mobile unit of the present embodiment is the one for controlling the CPU's, so as to modify the embodiment-related measurement interval for the instantaneous CQI values. The information handled at various units and sections may be temporarily stored in a RAM or for storage in ROM or HDD, so that stored data may be read out by the CPU, for readout, modification and write-in.

For the storage of the above programs, semiconductor memories (such as ROM, non-volatile memory), optical memory (e.g., DVD, MO, MD, CD, BD, etc.), and magnetic memory (e.g., magnetic tape, flexible disk) may be used.

The running of the programs loaded on a computer provides the functions of the embodiment described above. Under the instructions by the programs, the operating system may jointly function with other application programs, etc., thereby to provide other functions.

The programs for the present invention, may be marketed through suitable storage media or online through internet. Therefore, the memory device described above may include those memory devices associated with servers linked to internet.

While the wireless communication system of the embodiment of the invention is assumed to be a frequency division duplex (FDD)-based system, time division duplex TDD may be used as well. In the case of the TDD system, in which a common frequency is used for the uplink and downlink, the instantaneous CQI values can be shared by the base station unit and the mobile unit without feeding back the instantaneous CQI values.

In regard to the term "feedback interval of the instantaneous CQI values" as used above in the embodiments, the term "interval" includes two factors, i.e., the time for measuring an individual CQI value, and the interval of feeding back the measured instantaneous CQI values. More specifically, assuming the situation where the measured instantaneous CQI values are fed back in the ordinary mode at the interval of 4TTI, the measurement mode processing may be associated with ordinary mode processing, so that the instantaneous CQI value measured at 4TTI may be skipped by one measured value, thereby to feed back the measured instantaneous CQI value at an interval of 8TTI or, alternatively, the measured instantaneous CQI values may be fed back at an interval of 7TTI without having the measurement mode associated with the ordinary mode. It will be noted in the above embodiment that above-mentioned two factors are selectively used in the measurement mode.

It will also be noted that the measurement interval in the ordinary mode may be made variable depending on how the mobile communication system is utilized, instead of being fixed at a certain value.

While preferred embodiments and modifications of the invention have been described and illustrated above, it should be understood that these are exemplary of the invention and not to be considered as limiting. Additions, omissions, substitutions and other modifications can be made without departing from the spirit or scope of the invention. Accordingly, the invention is to be considered as being not limited by the foregoing description, and is only limited by the scope of the appended claims.

The invention claimed is:

1. A mobile communication system comprising:
a plurality of mobile units; and
a plurality of base station units, wherein
while at least one mobile unit of the plurality of mobile units is communicating with one base station unit of the plurality of base station units, the at least one mobile unit, prior to a handover and prior to monitoring of a radio access technology of another base station unit, notifies the one base station unit of the radio access technology to be monitored by the at least one mobile unit, the one base station unit decides a length of a period between durations during which the at least one mobile station receives data from the one base station unit, during which period the at least one mobile unit monitors the another base station unit, the length decision being made depending on the radio access technology notified by the at least one mobile unit, and depending on a predetermined rule, the at least one mobile unit stores the same predetermined rule considered by the one base station unit and also decides the length of the period, the length of the period decided by the at least one mobile unit thus being the same as the length decided by the one base station unit, the length decision at the at least one mobile unit being made depending on the radio access technology notified to the one base station unit, and depending on the predetermined rule, the length decided independently by each of the one base station unit and the at least one mobile unit, and the predetermined rule indicating that the length of the period is selected from a plurality of candidate lengths of the period, the candidate lengths including a first length corresponding to a first radio access technology and a second length corresponding to a second radio access technology, wherein the first length is shorter than the second length, the selection being made depending on the radio access technology to be monitored.

2. The mobile communication system according to claim 1, wherein a period setting section of the one base station unit simultaneously decides a plurality of period lengths, in a case that the notification from the at least one mobile unit identifies plural radio access technologies monitored by the at least one mobile unit, wherein, in a case that, during a period having the first length from among the plurality of period lengths, the one base station unit receives from the at least one mobile unit a reception quality indicator, the one base station unit resets the period to the second length among the plurality of the simultaneously decided lengths, and in a case that, during the period having the first length, the one base station unit does not receive the reception quality indicator from the at least one mobile unit, the one base station unit continuously sets the period length at values longer than the first length until the reception quality indicator is received.

3. The mobile communication system according to claim 1, wherein a communication between the at least one mobile unit and the one base station unit temporarily is not performed during the period.

4. A processing method performed by a subject base station unit, the method comprising:

acquiring, prior to a handover and prior to monitoring of a radio access technology of another base station unit, from a mobile unit with which the subject base station is communicating, notification identifying the radio access technology to be monitored by the mobile unit; and deciding, in the subject base station unit, a length of a period between durations during which the mobile station receives data from the subject base station unit, in which period the mobile unit monitors the another base station unit, the length decision being made depending on the radio access technology identified in the notification acquired from the mobile unit, and depending on a predetermined rule, wherein the predetermined rule indicates that the length of the period is selected from a plurality of candidate lengths of the period, the candidate lengths including a first length corresponding to a first radio access technology and a second length corresponding to a second radio access technology, wherein the first length is shorter than the second length, the selection being made depending on the radio access technology identified in the notification acquired from the mobile unit, and the predetermined rule is the same as a rule independently decided by and used by the mobile unit to set the length of the period at the mobile unit, the length of the period decided by the mobile unit thus being the same as the length decided by the subject base station unit.

5. The processing method according to claim 4, wherein the subject base station unit temporarily does not perform a communication with the mobile unit during the period.

6. A subject base station unit, comprising:

an acquisition unit that, prior to a handover and prior to monitoring of a radio access technology of another base station unit, acquires, from a mobile unit with which the subject base station unit is communicating, notification identifying the radio access technology to be monitored by the mobile unit;

a period length deciding section that decides a length of a period between durations during which the mobile station receives data from the subject base station unit, in which period the mobile unit monitors the another base station unit, the length decision being made depending on the radio access technology identified in the notification acquired from the mobile unit, and depending on a predetermined rule, wherein the predetermined rule indicates that the length of the period is selected from a plurality of candidate lengths of the period, the candidate lengths including a first length corresponding to a first radio access technology and a second length corresponding to a second radio access technology, wherein the first length is shorter than the second length, the selection being made depending on the radio access technology identified in the notification acquired from the mobile unit, and the predetermined rule is the same as a rule independently decided by and used by the mobile unit to set the length of the period at the mobile unit, the length of the period decided by the mobile unit thus being the same as the length decided by the subject base station unit.

7. The subject base station unit according to claim 6, wherein the subject base station unit temporarily does not perform a communication with the mobile unit during the period.

8. A processing method performed by a mobile unit in a mobile communication system, comprising:

prior to a handover and prior to monitoring of a radio access technology of another base station unit, while the mobile unit is communicating with one base station unit from among a plurality of base station units, notifying the one base station unit of the radio access technology to be monitored by the mobile unit; and deciding a length of a period in which the mobile unit monitors the radio access technology of the another base station unit, the length decision of the mobile unit being made depending on the radio access technology notified to the one base station unit, and depending on a predetermined rule, wherein the predetermined rule indicates that the length of the period is selected from a plurality of candidate lengths of the period, the candidate lengths including a first length corresponding to a first radio access technology and a second length corresponding to a second radio access technology, wherein the first length is shorter than the second length, the selection being made depending on the radio access technology to be monitored, and the predetermined rule is the same as a rule independently decided by and used by the one base station unit to set the length of the period at the one base station unit, the length of the period decided by the mobile unit thus being the same as the length decided by the one base station unit.

9. The processing method according to claim 8, wherein the mobile unit temporarily does not perform a communication with the notified base station unit during the period.

10. A mobile unit in a mobile communication system, comprising:

a notification unit configured to, prior to a handover and prior to monitoring of a radio access technology of another base station unit, while the mobile unit is communicating with one base station unit from among a plurality of base station units, notify the one base station unit of the radio access technology to be monitored by the mobile unit; and a deciding unit that decides a length of a period in which the mobile unit monitors the radio access technology of the another base station unit, the length decision of the mobile unit being made depending on the radio access technology notified to the one base station unit, and depending on a predetermined rule, wherein the predetermined rule indicates that the length of the period is selected from a plurality of candidate lengths of the period, the candidate lengths including a first length corresponding to a first radio access technology and a second length corresponding to a second radio access technology, wherein the first length is shorter than the second length, the selection being made depending on the radio access technology to be monitored, and wherein the predetermined rule is the same as a rule independently decided by and used by the one base station unit to set the length of the period at the one base station unit, the length of the period decided by the mobile unit thus being the same as the length decided by the one base station unit.

11. The mobile unit according to claim 10, wherein the mobile unit temporarily does not perform a communication with the notified base station unit during the period.

* * * * *